United States Patent
Fan et al.

(10) Patent No.: US 12,449,172 B2
(45) Date of Patent: Oct. 21, 2025

(54) SYSTEMS AND METHODS FOR CONTROLLING VARIABLE REFRIGERANT FLOW SYSTEMS USING ARTIFICIAL INTELLIGENCE

(71) Applicant: Johnson Controls Tyco IP Holdings LLP, Milwaukee, WI (US)

(72) Inventors: Bo Fan, Wuxi (CN); Zhigang Wu, Suzhou (CN); Hayato Mori, Tokyo (JP); Zhongyue Sun, Milwaukee, WI (US); Liming Yang, Mequon, WI (US); Robert D. Turney, Watertown, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 105 days.

(21) Appl. No.: 18/110,723

(22) Filed: Feb. 16, 2023

(65) Prior Publication Data

US 2023/0194137 A1 Jun. 22, 2023

Related U.S. Application Data

(63) Continuation of application No. PCT/CN2021/122767, filed on Oct. 9, 2021.

(51) Int. Cl.
*F25B 49/02* (2006.01)
*F25B 13/00* (2006.01)
*F25B 45/00* (2006.01)

(52) U.S. Cl.
CPC .............. *F25B 49/02* (2013.01); *F25B 13/00* (2013.01); *F25B 45/00* (2013.01);
(Continued)

(58) Field of Classification Search
CPC .......... F25B 49/02; F25B 13/00; F25B 45/00; F25B 2345/001; F25B 2500/06;
(Continued)

(56) References Cited

U.S. PATENT DOCUMENTS

| 5,860,286 A | 1/1999 | Tulpule |
| 6,442,511 B1 | 8/2002 | Sarangapani et al. |

(Continued)

FOREIGN PATENT DOCUMENTS

| CN | 1734217 A | 2/2006 |
| CN | 1906453 A | 1/2007 |

(Continued)

OTHER PUBLICATIONS

Allibhai, Eijaz, "Building a Convolutional Neural Network (CNN) in Keras". Oct. 16, 2018, Retrieved from the internet. URL: https://towardsdatascience.com/building-a-convolutional-neural-network-cnn-in-keras-329fbbadc5f5?gi=a4b7948c82b7 [retrieved on Nov. 26, 2019] (pp. 1-8).

(Continued)

*Primary Examiner* — Kun Kai Ma
(74) *Attorney, Agent, or Firm* — Foley & Lardner LLP

(57) ABSTRACT

A refrigerant charge controller for heating, ventilation, or air conditioning (HVAC) equipment includes a processing circuit configured to analyze usage data for the HVAC equipment using a machine learning model to estimate an amount of refrigerant used by the HVAC equipment, identify a refrigerant deficiency based on the amount of refrigerant, and initiate a corrective action in response to identifying the refrigerant deficiency.

20 Claims, 23 Drawing Sheets

(52) U.S. Cl.
CPC ..... *F25B 2345/001* (2013.01); *F25B 2500/06* (2013.01); *F25B 2500/222* (2013.01); *F25B 2700/04* (2013.01)

(58) Field of Classification Search
CPC ............ F25B 2500/222; F25B 2700/04; F25B 31/004; F25B 2313/0231; F25B 2313/02742; F25B 2400/075; F25B 2500/24; F25B 2700/1931; F25B 2700/1933; F25B 2700/21151; F25B 2700/21152; F25B 2700/21163; F25B 2700/21175; F25B 49/005
See application file for complete search history.

(56) References Cited

U.S. PATENT DOCUMENTS

| | | | |
|---|---|---|---|
| 6,759,777 | B2 | 7/2004 | Takahata et al. |
| 6,853,920 | B2 | 2/2005 | Hsiung et al. |
| 7,581,434 | B1 | 9/2009 | Discenzo et al. |
| 9,117,169 | B2 | 8/2015 | Jamison et al. |
| 9,223,644 | B1 | 12/2015 | Schrock et al. |
| 9,645,575 | B2 | 5/2017 | Watson |
| 10,260,388 | B2 | 4/2019 | Potyrailo et al. |
| 10,430,725 | B2 | 10/2019 | Anderson et al. |
| 10,809,707 | B2 * | 10/2020 | Buda ................ F25B 49/005 |
| 11,441,800 | B2 | 9/2022 | Rowswell et al. |
| 11,494,295 | B1 | 11/2022 | Sirianni |
| 11,739,964 | B1 | 8/2023 | Donahue et al. |
| 2003/0055798 | A1 | 3/2003 | Hittle et al. |
| 2003/0171897 | A1 | 9/2003 | Bieda et al. |
| 2005/0115253 | A1 | 6/2005 | Sienel |
| 2005/0210337 | A1 | 9/2005 | Chester et al. |
| 2007/0032964 | A1 | 2/2007 | Kaldor et al. |
| 2008/0033674 | A1 | 2/2008 | Nikovski et al. |
| 2012/0072029 | A1 | 3/2012 | Persaud et al. |
| 2012/0166363 | A1 | 6/2012 | He et al. |
| 2012/0173299 | A1 | 7/2012 | McMullin |
| 2013/0304239 | A1 | 11/2013 | Turolla |
| 2015/0267951 | A1 | 9/2015 | Berg et al. |
| 2016/0018381 | A1 | 1/2016 | Potyrailo et al. |
| 2016/0203036 | A1 | 7/2016 | Mezic et al. |
| 2016/0370799 | A1 | 12/2016 | Denton et al. |
| 2018/0306616 | A1 | 10/2018 | Gillette et al. |
| 2018/0362862 | A1 | 12/2018 | Gellaboina et al. |
| 2019/0123931 | A1 | 4/2019 | Schuster et al. |
| 2019/0145668 | A1 | 5/2019 | Takahashi et al. |
| 2019/0170603 | A1 | 6/2019 | Gupte et al. |
| 2019/0264936 | A1 | 8/2019 | Bailey et al. |
| 2019/0293494 | A1 | 9/2019 | Mao et al. |
| 2019/0338972 | A1 | 11/2019 | Schuster et al. |
| 2019/0338974 | A1 | 11/2019 | Turney et al. |
| 2019/0354071 | A1 | 11/2019 | Turney et al. |
| 2019/0362036 | A1 | 11/2019 | Zhang et al. |
| 2019/0390885 | A1 * | 12/2019 | Contrada ................ G01N 21/31 |
| 2020/0103894 | A1 | 4/2020 | Cella et al. |
| 2020/0240662 | A1 | 7/2020 | Picardi et al. |
| 2020/0241514 | A1 | 7/2020 | Sun |
| 2020/0379454 | A1 | 12/2020 | Trinh et al. |
| 2020/0387785 | A1 | 12/2020 | He et al. |
| 2021/0096555 | A1 | 4/2021 | Williams |
| 2021/0302275 | A1 | 9/2021 | Tambe et al. |
| 2021/0381861 | A1 | 12/2021 | Brown et al. |
| 2022/0004182 | A1 | 1/2022 | Natsumeda |
| 2022/0170679 | A1 | 6/2022 | Fujimoto et al. |
| 2022/0187815 | A1 | 6/2022 | Sinha |
| 2022/0282897 | A1 * | 9/2022 | Gopalnarayanan ..... F25B 13/00 |
| 2022/0296930 | A1 | 9/2022 | Chen et al. |
| 2022/0342411 | A1 | 10/2022 | Hirose et al. |
| 2023/0015709 | A1 | 1/2023 | Bisht et al. |
| 2023/0116964 | A1 | 4/2023 | Sun et al. |

FOREIGN PATENT DOCUMENTS

| | | | |
|---|---|---|---|
| CN | 101048626 A | 10/2007 | |
| CN | 103277875 A | 9/2013 | |
| CN | 104279720 A | 1/2015 | |
| CN | 106461252 A | 2/2017 | |
| CN | 107975978 A | 5/2018 | |
| CN | 108334937 A | 7/2018 | |
| CN | 109213127 A | 1/2019 | |
| CN | 109964086 A | 7/2019 | |
| CN | 111765676 A | 10/2020 | |
| DE | 10 2013 106 806 A1 | 12/2014 | |
| JP | H05-157668 A | 6/1993 | |
| JP | H06-074876 A | 3/1994 | |
| JP | 2005-207644 A | 8/2005 | |
| JP | 6652219 B1 * | 2/2020 | ............. F24F 11/36 |
| KR | 20210093666 A * | 7/2021 | |
| KR | 20210094935 A * | 7/2021 | |
| WO | WO-2018/092258 A1 | 5/2018 | |
| WO | WO-2020203977 A1 * | 10/2020 | ............. F24F 11/32 |
| WO | WO-2020/234935 A1 | 11/2020 | |
| WO | WO-2021050704 A1 * | 3/2021 | ............. F24F 11/36 |
| WO | WO-2021/179250 A1 | 9/2021 | |
| WO | WO-2023/056617 A1 | 4/2023 | |

OTHER PUBLICATIONS

Hochreiter et al., "Long Short-Term Memory," Neural Computation, 1997, vol. 9, No. 8 (pp. 1735-1780).
International Search Report and Written Opinion on PCT Appl. Ser. No. PCT/CN2020/079004 dated Dec. 15, 2020 (9 pages).
JP Office Action for JP Appl. Ser. No. 2022-554346 dated Jan. 9, 2024 (14 pages).
JP Office Action for JP Appl. Ser. No. 2022-554346 dated Jul. 30, 2024 (7 pages).
International Search Report and Written Opinion on PCT Appl. Ser. No. PCT/CN2021/122767 dated Jul. 5, 2022 (9 pages).
CN Office Action for CN Appl. Ser. No. 202080100503 dated Mar. 21, 2025 (18 pages).
JP Office Action for JP Appl. Ser. No. 2024-521301 dated Jun. 24, 2025 (19 pages).
CN Office Action for CN Appl. Ser. No. 202080100502.X daed Aug. 10, 2025 (14 pages).

* cited by examiner

SYSTEMS AND METHODS FOR CONTROLLING VARIABLE REFRIGERANT FLOW SYSTEMS USING ARTIFICIAL INTELLIGENCE

CROSS-REFERENCE TO RELATED PATENT APPLICATION

This application is a continuation of International Application No. PCT/CN2021/122767 filed Oct. 9, 2021, the entire disclosure of which is incorporated by reference herein.

BACKGROUND

The present disclosure relates generally to the field of operating building equipment, and more particularly to using artificial intelligence to predict states of the building equipment.

For building equipment (e.g., heating, ventilation, or air conditioning (HVAC) equipment) to operate effectively and to minimize degradation of the building equipment, various operating conditions of the building equipment should be monitored and accounted for. However, traditional building systems leave many operating conditions unmonitored which can lead to rapid degradation of the building equipment and increased costs over time.

While some operating conditions can be monitored by installing additional sensors, it can be difficult and costly to install additional sensors in some locations, especially if the sensors need to be embedded into existing HVAC equipment to measure the desired condition effectively. Other operating conditions cannot be feasibly measured, for example if they do not correspond to a measurable quantity, or are otherwise incapable of measurement in some HVAC systems. It would be desirable to provide a system capable of monitoring such operating conditions without requiring additional sensors.

SUMMARY

One implementation of the present disclosure is a refrigerant charge controller for heating, ventilation, or air conditioning (HVAC) equipment, the controller comprising a processing circuit configured to analyze usage data for the HVAC equipment using a machine learning model to estimate an amount of refrigerant used by the HVAC equipment, identify a refrigerant deficiency based on the amount of refrigerant, and initiate a corrective action in response to identifying the refrigerant deficiency.

In some embodiments, the HVAC equipment comprise one or more compressors configured to circulate the refrigerant within a refrigeration circuit, and the usage data comprise at least one of a suction temperature or suction pressure of the refrigerant at a suction of the one or more compressors or a discharge temperature or discharge pressure of the refrigerant at a discharge of the one or more compressors.

In some embodiments, the HVAC equipment comprise one or more valves configured to control a flow of the refrigerant within a refrigeration circuit comprising one or more fluid conduits, and the usage data comprise at least one of a valve position of the one or more valves or a length of the one or more fluid conduits.

In some embodiments, the HVAC equipment comprise variable refrigerant flow (VRF) equipment configured to operate in a heating mode in which the VRF equipment provide heating to a building space and a cooling mode in which the VRF equipment provide cooling to the building space, and the usage data are collected while the VRF equipment operate in the heating mode.

In some embodiments, the processing circuit is configured to simulate operation of the HVAC equipment under a variety of test conditions to generate a set of simulated operational data, and train the machine learning model using the set of simulated operational data.

In some embodiments, identifying the refrigerant deficiency comprises determining that the amount of refrigerant is less than a threshold, and initiating the corrective action comprises automatically charging more refrigerant into a refrigeration circuit used by the HVAC equipment.

In some embodiments, identifying the refrigerant deficiency comprises detecting a refrigerant leak in a refrigeration circuit used by the HVAC equipment, and initiating the corrective action comprises initiating a maintenance activity to repair the refrigerant leak.

Another embodiment is a controller for variable refrigerant flow (VRF) equipment, the controller comprising a processing circuit configured to analyze usage data for the VRF equipment using a machine learning model to estimate an amount of liquid in the VRF equipment, identify a liquid deficiency based on the amount of liquid, and initiate a corrective action in response to identifying the liquid deficiency.

In some embodiments, the VRF equipment comprise one or more compressors configured to circulate a refrigerant within a refrigeration circuit, and the usage data comprise at least one of a suction pressure of the refrigerant at a suction of the one or more compressors or a discharge temperature or discharge pressure of the refrigerant at a discharge of the one or more compressors.

In some embodiments, the VRF equipment comprise one or more compressors configured to circulate a refrigerant within a refrigeration circuit, and the usage data comprise at least one of a sub cooling temperature of a vapor of the refrigerant, a dry bulb temperature, and a charge volume of the refrigerant.

In some embodiments, the processing circuit is configured to simulate operation of the VRF equipment under a variety of test conditions to generate a set of simulated operational data, and train the machine learning model using the set of simulated operational data.

In some embodiments, the amount of liquid is an estimated amount of the liquid in an accumulator or one or more indoor VRF units of the VRF equipment, identifying the liquid deficiency comprises determining that the amount of liquid is more than a threshold, and initiating the corrective action comprises automatically returning a portion of the liquid to a compressor or outdoor VRF unit of the VRF equipment.

Another embodiment is a controller for variable refrigerant flow (VRF) equipment, the controller comprising one or more processing circuits configured to analyze a first set of usage data for the VRF equipment using a first machine learning model to estimate an amount of refrigerant used by the VRF equipment, analyze a second set of usage data for the VRF equipment using a second machine learning model to estimate an amount of liquid in the VRF equipment, identify a liquid deficiency based on the amount of liquid, and initiate a corrective action in response to identifying the liquid deficiency.

In some embodiments, the second set of usage data includes the amount of refrigerant used by the VRF estimated by analyzing the first set of usage data.

In some embodiments, the VRF equipment comprise one or more compressors configured to circulate the refrigerant within a refrigeration circuit, and the first set of usage data comprise at least one of a suction temperature or suction pressure of the refrigerant at a suction of the one or more compressors or a discharge temperature or discharge pressure of the refrigerant at a discharge of the one or more compressors.

In some embodiments, the VRF equipment comprise one or more valves configured to control a flow of the refrigerant within a refrigeration circuit comprising one or more fluid conduits, and the first set of usage data comprise at least one of a valve position of the one or more valves or a length of the one or more fluid conduits.

In some embodiments, the VRF equipment are configured to operate in a heating mode in which the VRF equipment provide heating to a building space and a cooling mode in which the VRF equipment provide cooling to the building space, and the first set of usage data are collected while the VRF equipment operate in the heating mode.

In some embodiments, the one or more processing circuits are configured to simulate operation of the HVAC equipment under a first variety of test conditions to generate a first set of simulated operational data and train the first machine learning model using the first set of simulated operational data, and simulate operation of the HVAC equipment under a second variety of test conditions to generate a second set of simulated operational data and train the second machine learning model using the second set of simulated operational data.

In some embodiments, the amount of liquid is an estimated amount of the liquid in an accumulator or one or more indoor VRF units of the VRF equipment, identifying the liquid deficiency comprises determining that the amount of liquid is more than a threshold, and initiating the corrective action comprises automatically returning a portion of the liquid to a compressor or one or more outdoor VRF units of the VRF equipment.

In some embodiments, identifying the liquid deficiency comprises determining that the amount of liquid is more than a threshold in an accumulator of the VRF equipment, and initiating the corrective action comprises automatically returning a portion of the liquid from the accumulator to a compressor of the VRF equipment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
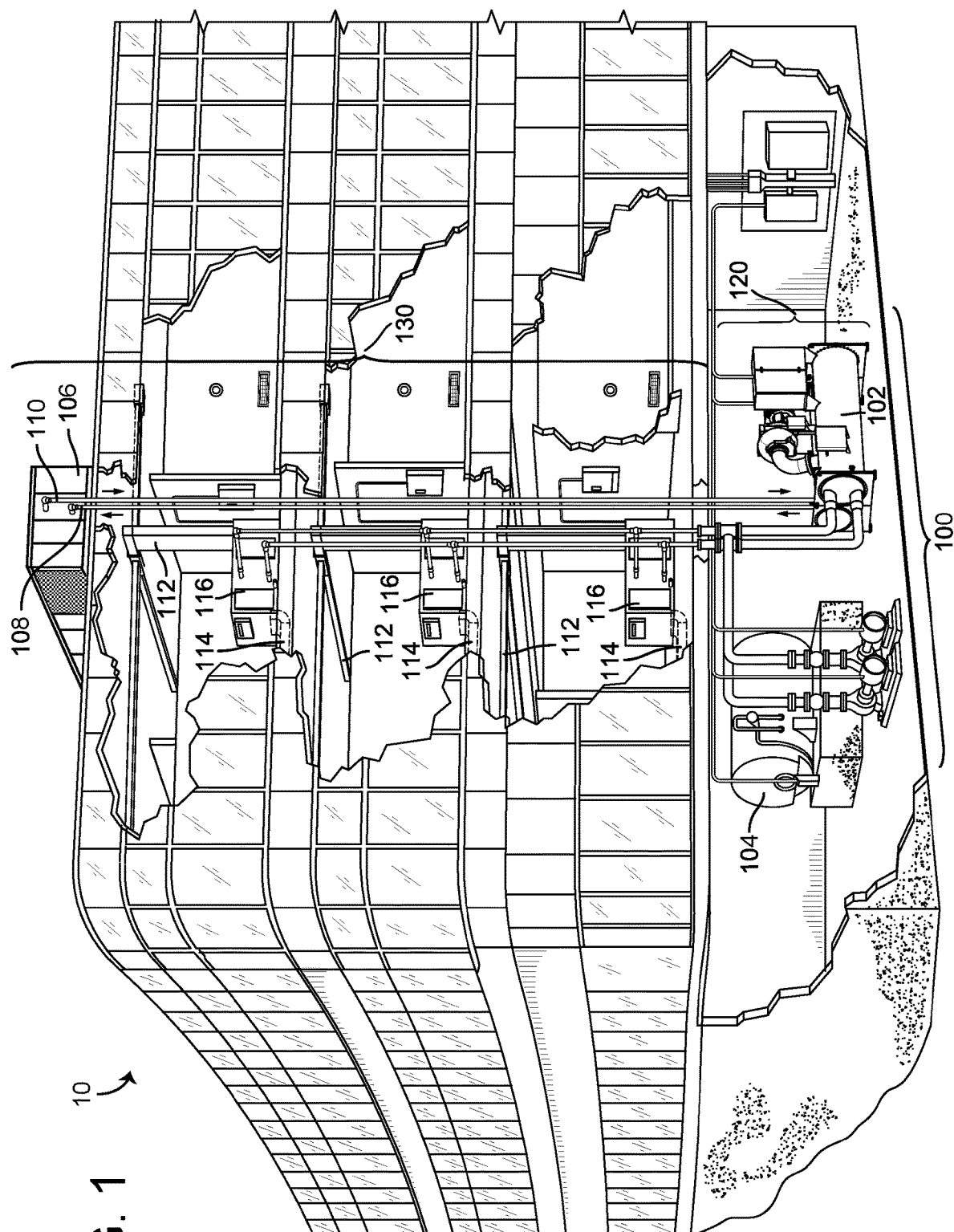
FIG. 1 is a perspective view of a building including a heating, ventilating, or air conditioning (HVAC) system, according to some embodiments.

Referring generally to the FIGURES, systems and methods for utilizing artificial intelligence (AI) in predicting characteristics of variable refrigerant flow (VRF) systems of a building and operating VRF systems and VRF system components are shown, according to some embodiments. In particular, the present disclosure uses AI to predict characteristics of refrigerant used in VRF systems, as well as, for predicting various states of refrigerant in VRF systems.

It should be appreciated, however, that the systems and methods described herein are not limited to VRF systems. Rather, VRF systems are shown and described for sake of example only as one potential implementation of the present disclosure. The systems and methods described herein can be applied to a variety of systems (e.g., other environmental control systems) that require refrigerant to be provided to equipment, as well as, other types of systems that include compressors, motors, any type of equipment that use refrigerant, and/or any type of equipment that requires liquid. For example, the systems and methods described herein can be applied to a variety of heating, ventilation, or air conditioning (HVAC) systems and devices (e.g., various air conditioning equipment, variable air volume (VAV) systems, residential air conditioning (RAC) systems, etc.), fire suppression systems, etc.

As referred to herein, AI and AI models can be used to describe a variety of different models that can be used in predicting states and other information associated with devices in VRF systems. In some embodiments, recurrent neural network (RNN) models are utilized for generating predictions. RNNs are a class of artificial neural networks where connections between nodes form a directed graph along a temporal sequence. More specifically, long short-term memory (LSTM) models may be utilized in generating predictions. LSTMs are a specific type of artificial RNN architecture that are used primarily for deep learning. LSTMs can classify and process entire sequences of time-series data and can make predictions based on said time-series data. Advantageously, LSTMs can account for lags of unknown duration between important events in a time series. In some embodiments, other types of AI models such as convolutional neural networks (CNNs) are utilized in generating predictions. Accordingly, it should be appreciated that various types of AI models can be utilized in generating predictions.

As defined herein, a characteristic of refrigerant, which is used interchangeably herein with the term "refrigerant characteristic," can refer to a particular property of the refrigerant. In other words, a refrigerant characteristic may be a variable state or condition of the refrigerant. Refrigerant characteristics (i.e., variable states or conditions of the refrigerant) of a VRF system may include, for example, refrigerant levels in one or more compressors, refrigerant levels in an oil separator, viscosity of the refrigerant, etc.

Specifically with regard to a VRF system, components of VRF systems occasional experience wear and tear (e.g., leakage, etc.) that may lower the overall efficiency and cause faults in the VRF system. When wear and tear occurs, some VRF systems contain an automatic refrigerant charge mode. The automatic refrigerant charge mode may automatically determines the optimal amount of refrigerant to be charged, thereby preventing a refrigerant shortage and/or energy loss due to insufficient refrigerant. However, traditional automatic refrigerant charge modes can only be operated when the VRF system is in a cooling mode, which may cause the VRF system transfer heat away from a medium being heated (e.g., a building, a home, etc.). For example, when an indoor VRF system operates the automatic refrigerant charge mode, a building may be required to be in the cooling mode, resulting in a loss of heat to the building.

As described in greater detail below, problems associated with traditional VRF systems (e.g., automatic refrigerant charge mode requirements, etc.) can be addressed through utilization of AI. AI can be used to predict the refrigerant characteristics (e.g., refrigerant level, etc.) in various building devices during any building mode (e.g., heating mode, cooling mode, off mode, etc.). Based on the predictions, the AI can perform automatic refrigerant charge mode functions to determine the optimal amount of refrigerant to be charged, refrigerant leak detection functions to determine operating states of the devices of the VRF system, and/or control the devices (e.g., valves, switches, etc.) to charge the proper amount of refrigerant and/or decrease the energy loss due to insufficient refrigerant.

Also as defined herein, a characteristic of liquid, which is used interchangeably herein with the term "liquid characteristic," can refer to a particular property of the liquid. In other words, a liquid characteristic may be a variable state or condition of the liquid. Liquid characteristics (i.e., variable states or conditions of the liquid) of a VRF system may include, for example, a refrigerant level in an accumulator of the VRF system, an oil level in the accumulator of the VRF system, an oil-refrigerant mixture level in the accumulator of the VRF system, refrigerant levels in one or more compressors of the VRF system, oil levels in one or more compressors of the VRF system, etc.

Specifically with regard to a VRF system, traditional VRF systems are favored for their efficiency, convenient control, and low maintenance costs. During operation, the reliability of a VRF system may be reflected by the liquid level of the gas fraction of the VRF system. As such, when designing control logic, the high and low changes of the liquid level may be monitored in order to avoid abnormal conditions in the VRF system (e.g., maintain a liquid control state). Under some operating conditions, some VRF devices (e.g., compressors, outdoor VRF units, etc.) fail to receive enough liquid (e.g., oil, refrigerant, etc.) from other VRF devices (e.g., accumulator, indoor VRF units, etc.). For example, in some situations refrigerant accumulates in indoor VRF units (e.g., an accumulator, etc.), resulting in a lower level of refrigerant in outdoor VRF units (e.g., compressors, etc.) that puts the outdoor VRF units at a higher risk of failure. As such, control logic may be designed to control components of the VRF system to return liquid (e.g., oil, refrigerant, etc.) to specific devices in the VRF system (e.g., compressors of a VRF unit, compressors of an outdoor VRF unit, etc.) in order to maintain a liquid control state. While traditional control logic may determine how to maintain a liquid control state (e.g., return oil, refrigerant, etc. to an outdoor VRF unit, an indoor VRF unit, a compressor, etc.), traditional VRF systems can only do so indirectly based on VRF system parameters (e.g., exhaust superheat, etc.). As such, if the gas fraction (e.g., liquid level) is applied as an auxiliary parameter, the control logic may better determine when to return to liquid control. In some embodiments, AI models can be leveraged to predict a liquid level in various building devices. Based on the predictions, the AI can determine the optimal time to maintain a liquid control state (e.g., return liquid, etc.) when a VRF system is in cooling/heating operation. Advantageously, the predictions performed by the AI can be made without the use of a sensor (e.g., an accumulator sensor). Not having to utilize sensors to detect liquid characteristics (e.g., refrigerant level, oil level, oil-refrigerant mixture level, etc.) can improve the reliability and the operating range of the VRF system.

Building HVAC Systems and Building Management Systems

Figure 2:
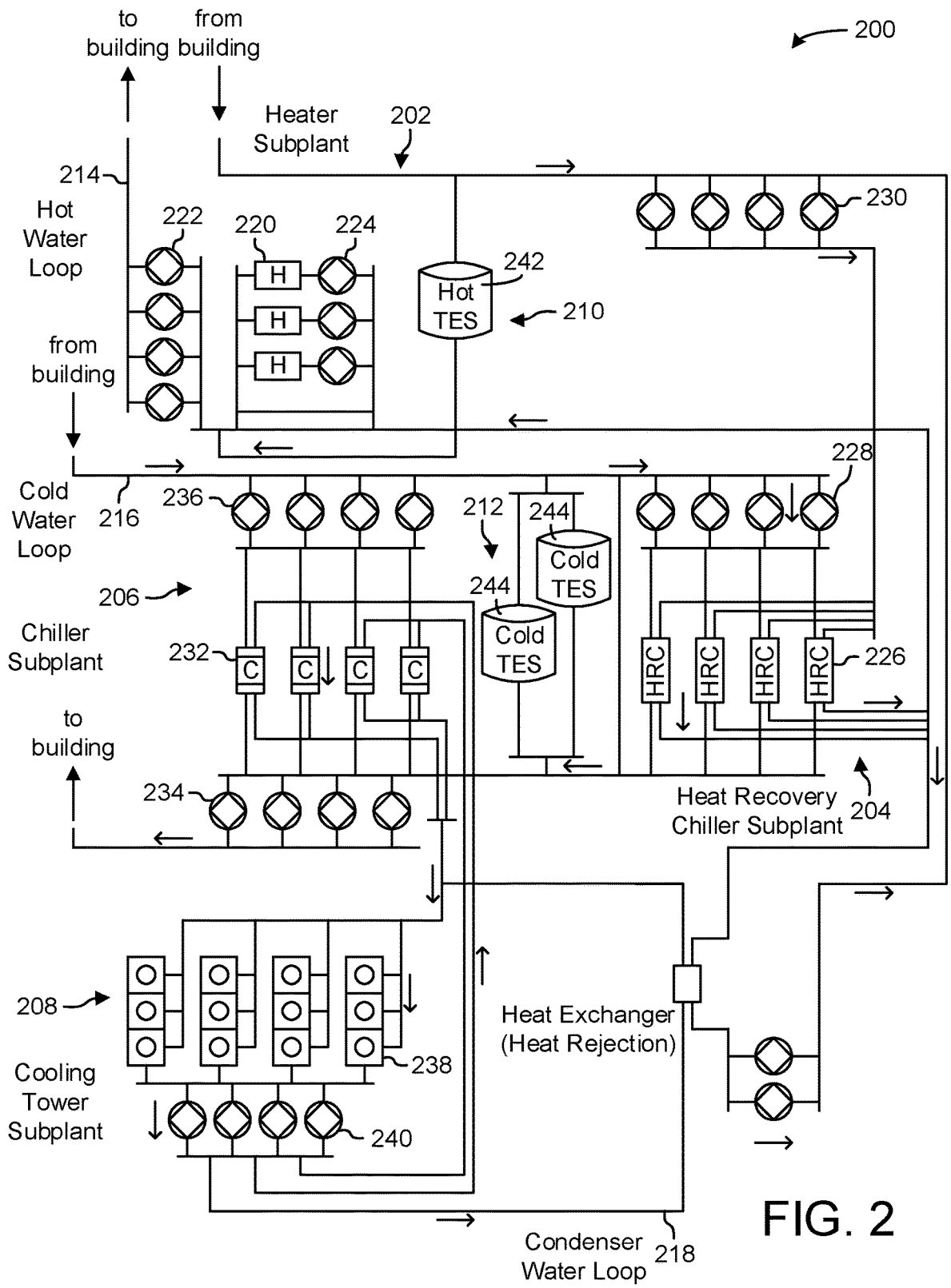
FIG. 2 is a block diagram of a waterside system which can be used to serve the heating or cooling loads of the building of FIG. 1, according to some embodiments.
Figure 3:
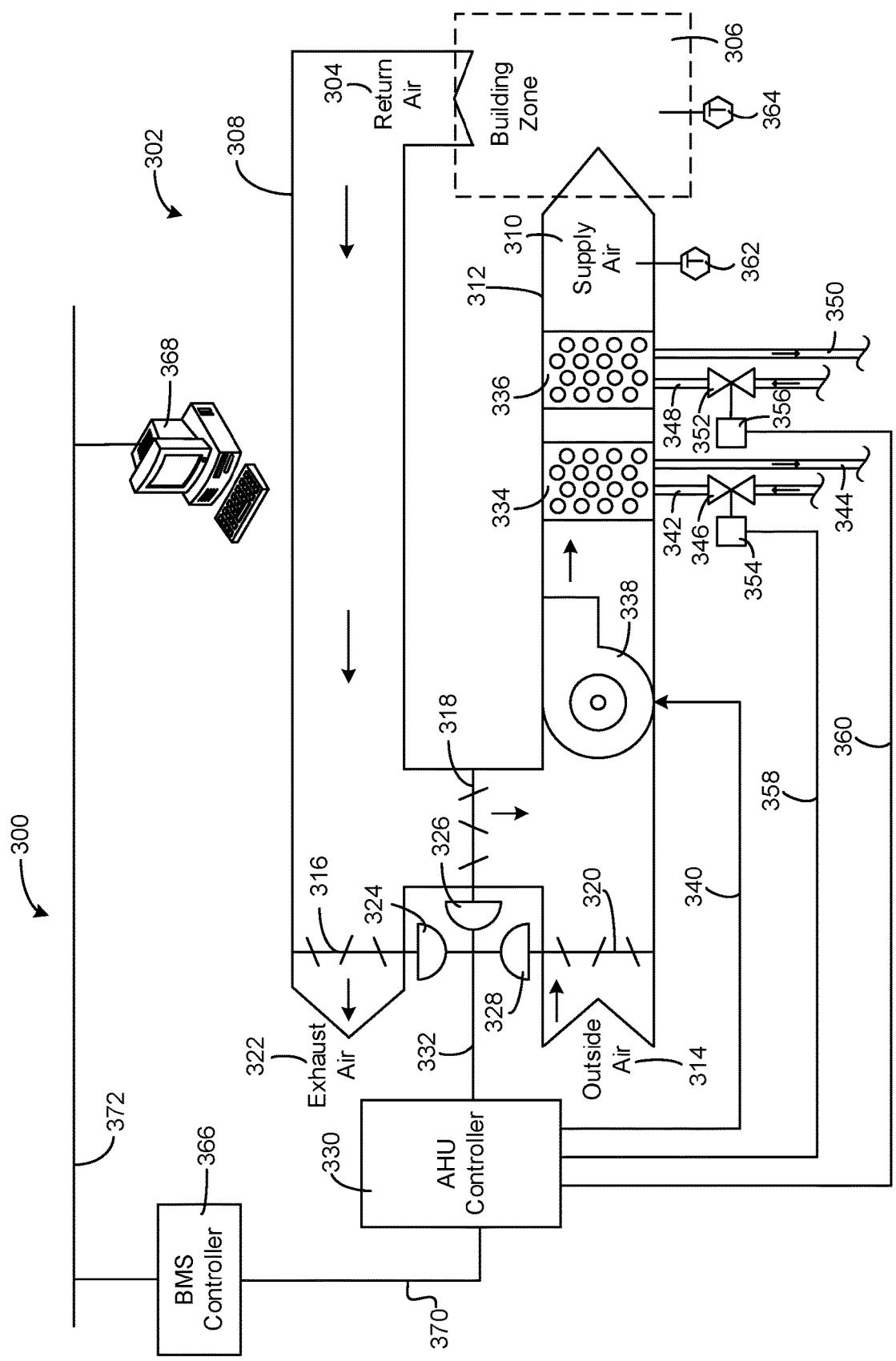
FIG. 3 is a block diagram of an airside system which can be used to serve the heating or cooling loads of the building of FIG. 1, according to some embodiments.
Figure 4:
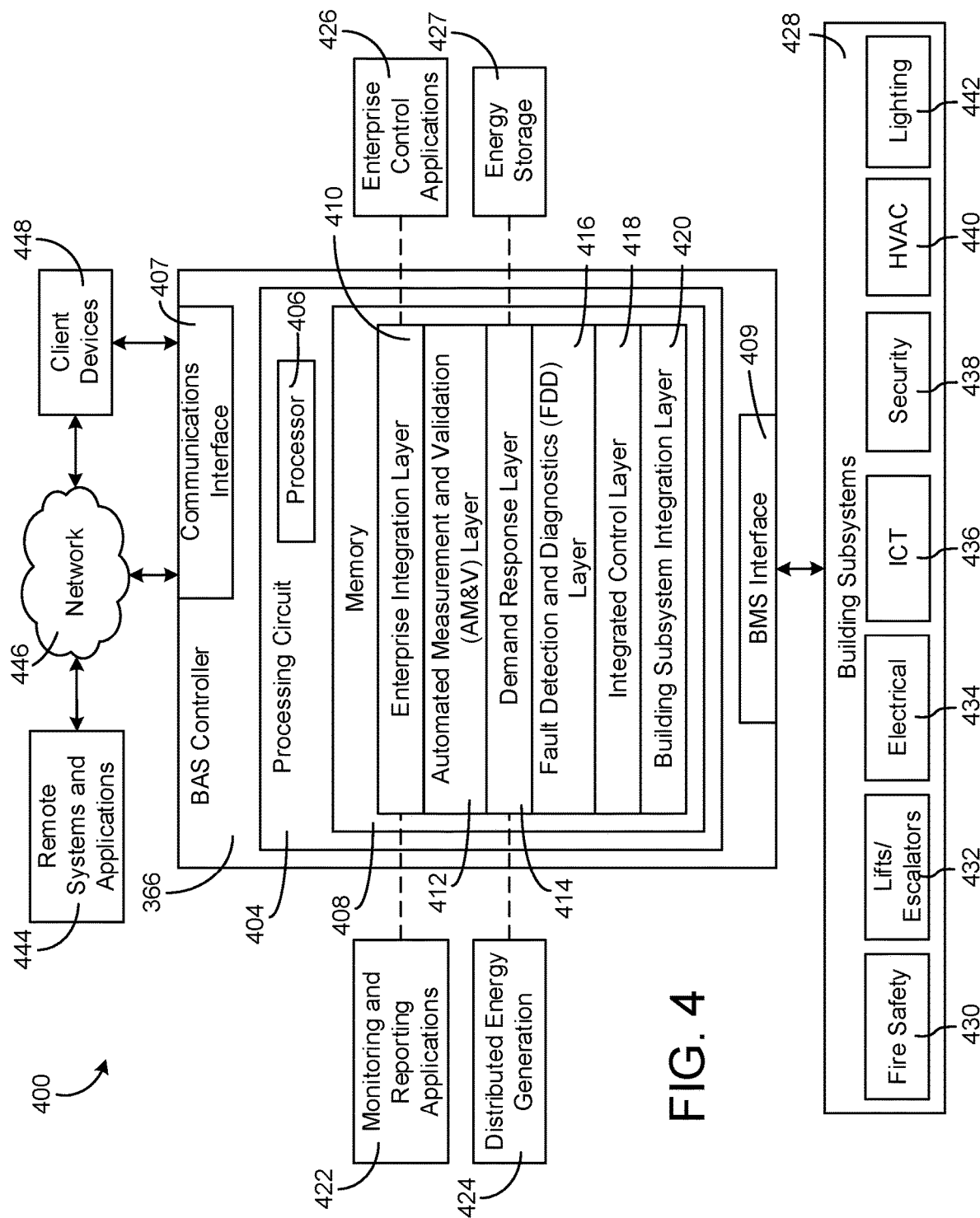
FIG. 4 is a block diagram of a building management system (BMS) which can be used to monitor and control the building of FIG. 1, according to some embodiments.
Figure 5:
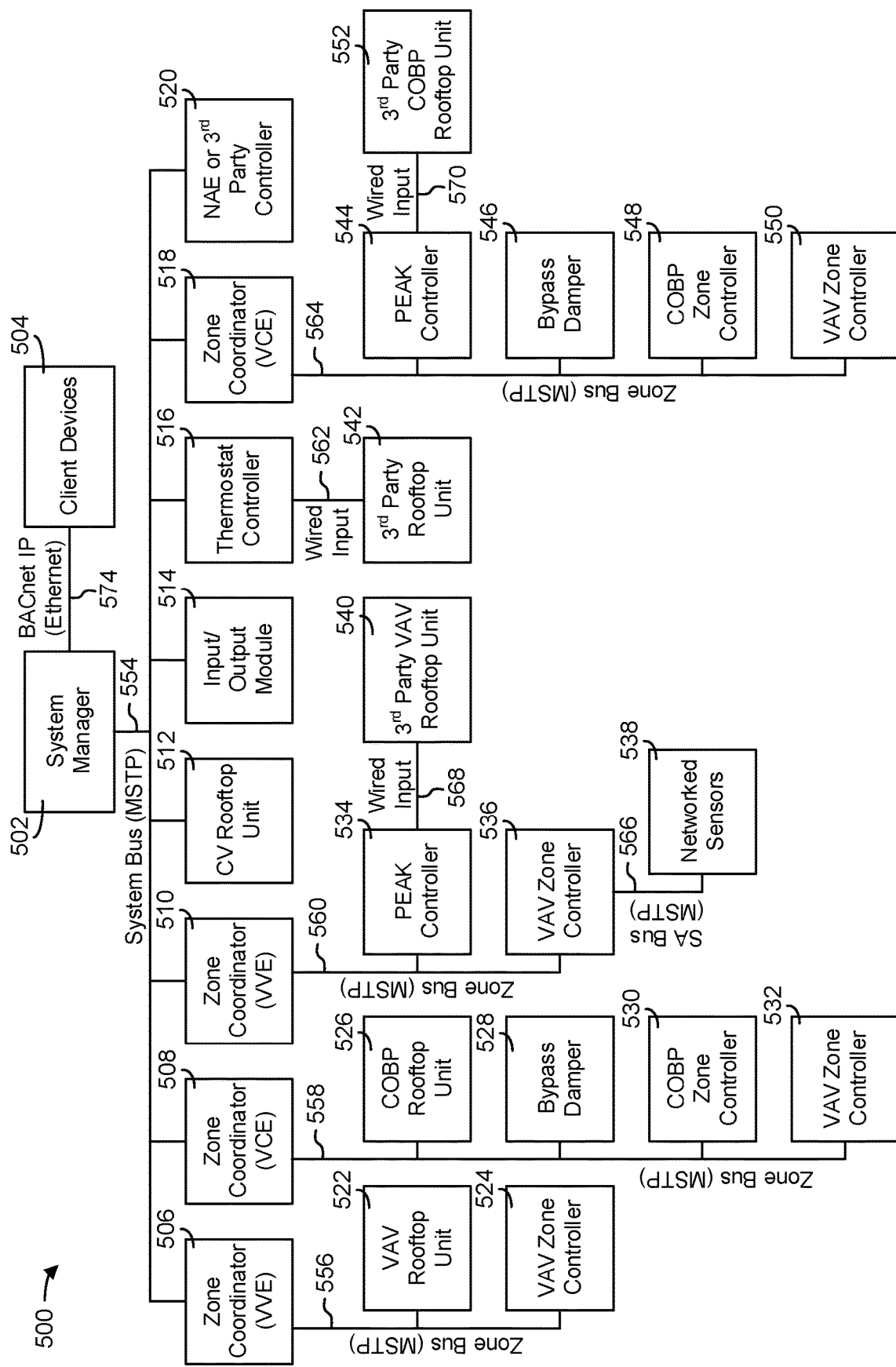
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described in FIGS. 2-3.

Each of building subsystems 428 can include any number of devices, controllers, and connections for completing its individual functions and control activities. HVAC subsystem 440 can include many of the same components as HVAC system 100, as described in FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or building subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 may translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the building subsystems 428 such that the building subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Variable Refrigerant Flow System

Figure 6A:
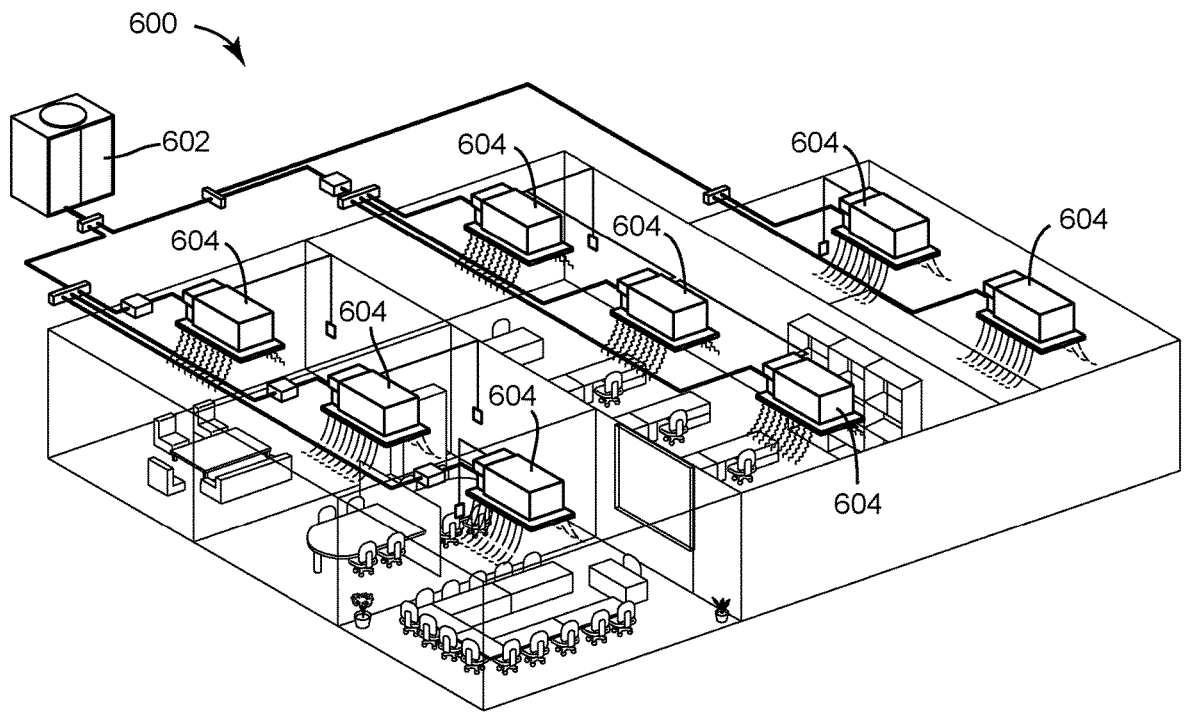
FIGS. 6A-6B are drawings of a variable refrigerant flow (VRF) system having one or more outdoor VRF units and multiple indoor VRF units, according to some embodiments.
Figure 6B:
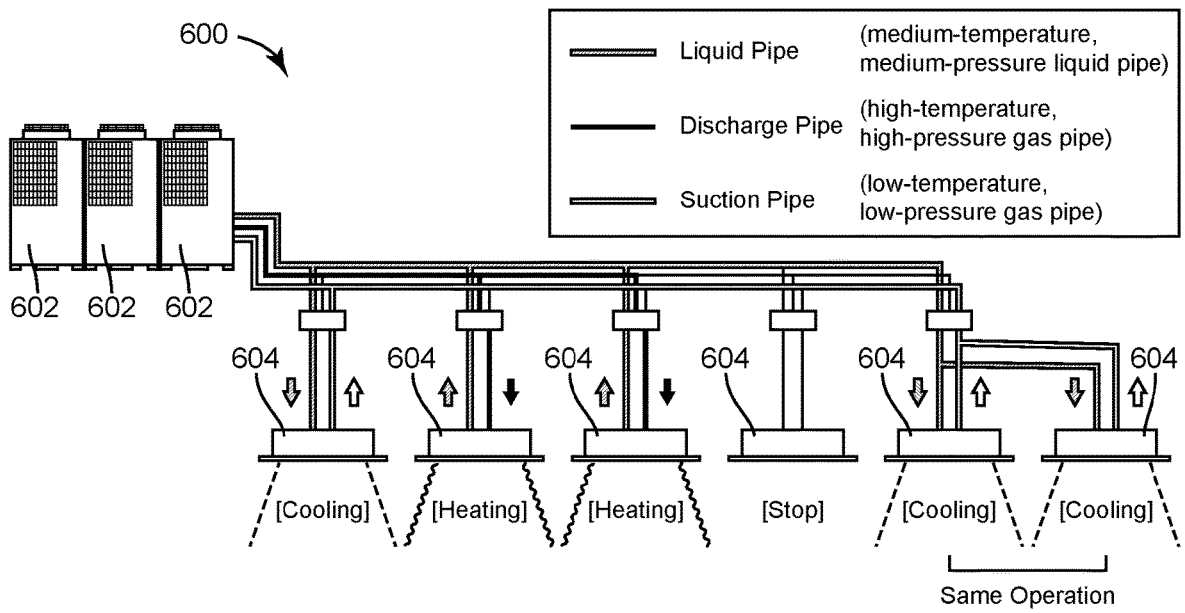

Referring now to FIGS. 6A-6B, a variable refrigerant flow (VRF) system 600 is shown, according to some embodiments. VRF system 600 is shown to include multiple outdoor VRF units 602 and multiple indoor VRF units 604. Outdoor VRF units 602 can be located outside a building and can operate to heat or cool a refrigerant. Outdoor VRF units 602 can consume electricity to convert refrigerant between liquid, gas, and/or super-heated gas phases. Indoor VRF units 604 can be distributed throughout various building zones within a building and can receive the heated or cooled refrigerant from outdoor VRF units 602. Each indoor VRF unit 604 can provide temperature control for the particular building zone in which the indoor VRF unit is located.

A primary advantage of VRF systems is that some indoor VRF units 604 can operate in a cooling mode while other indoor VRF units 604 operate in a heating mode. For example, each of outdoor VRF units 602 and indoor VRF units 604 can operate in a heating mode, a cooling mode, or an off mode. Each building zone can be controlled independently and can have different temperature setpoints. In some embodiments, each building has up to three outdoor VRF units 602 located outside the building (e.g., on a rooftop) and up to 128 indoor VRF units 604 distributed throughout the building (e.g., in various building zones).

Many different configurations exist for VRF system 600. In some embodiments, VRF system 600 is a two-pipe system in which each outdoor VRF unit 602 connects to a single refrigerant return line and a single refrigerant outlet line. In a two-pipe system, all of the outdoor VRF units 602 operate in the same mode since only one of a heated or chilled refrigerant can be provided via the single refrigerant outlet line. In other embodiments, VRF system 600 is a three-pipe system in which each outdoor VRF unit 602 connects to a refrigerant return line, a hot refrigerant outlet line, and a cold refrigerant outlet line. In a three-pipe system, both heating and cooling can be provided simultaneously via dual refrigerant outlet lines.

VRF system 600 can represent an example of a VRF system that may utilize AI to predict refrigerant characteristics (e.g., refrigerant levels, etc.), liquid characteristics (e.g., refrigerant levels, oil levels, oil-refrigerant levels, etc.), etc. to ensure components (e.g., outdoor VRF units 602, indoor VRF units 604, etc.) are operating correctly. Specifically, the VRF system 600 may leverage the systems and methods described throughout FIGS. 8-10 to ensure that all components have an adequate supply of refrigerant (e.g., charged refrigerant, etc.), an adequate supply of oil, etc.

Figure 7A:
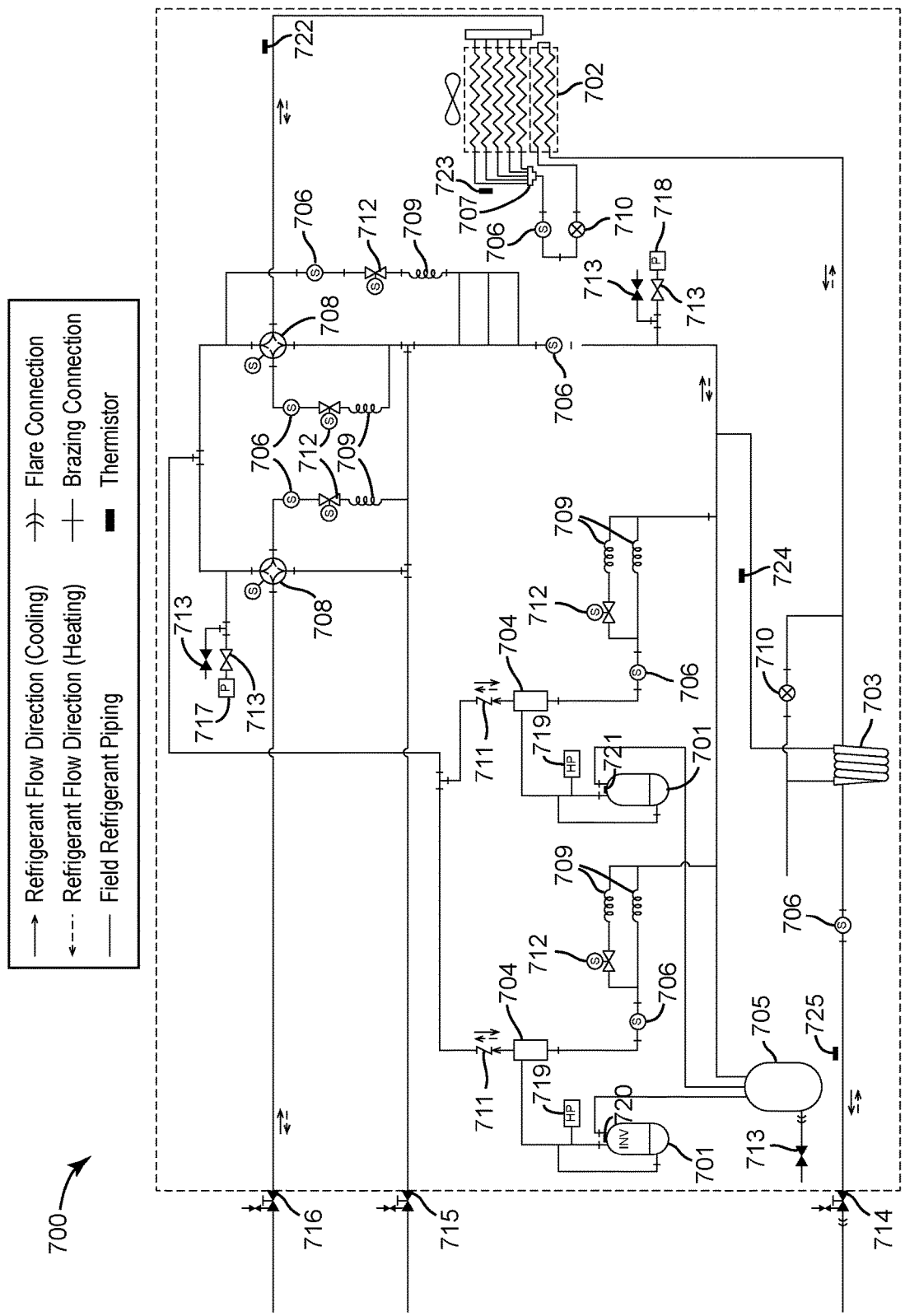
FIG. 7A is a schematic diagram of a VRF system, according to some embodiments.

Referring now to FIG. 7A, an illustration of a VRF system 700 is shown, according to some embodiments. In some embodiments, VRF system 700 is similar to and/or the same as VRF system 600 as described with reference to FIGS. 6A and 6B. More particularly, VRF system 700 can illustrate how oil is utilized in a VRF system. It should be noted that VRF system 700 is shown purely for sake of example of how a VRF system may operate. Components, relationships, and/or other features of VRF system 700 can be customized and configured based on particular implementations. For example, VRF system 700 may include more or fewer compressors 701 than as shown in FIG. 7A.

VRF system 700 is shown to include compressors 701, a heat exchanger 702, a double tube type heat exchanger 703, oil separators 704, and an accumulator 705. To operate properly, compressors 701 may require oil to ensure components of compressors 701 are properly lubricated. Without oil, the components may rapidly degrade and compressors 701 may fail to provide adequate cooling/heating to a zone. Heat exchangers 702 and 703 can transfer heat between fluids (e.g., oil and a refrigerant). Oil separators 704 can separate oil from refrigerant and/or other fluids in VRF system 700. Specifically, during operation, compressors 701 may leak and/or otherwise allow some oil to get mixed into refrigerant outputted by compressors 701. If said oil is not extracted back out of the oil/refrigerant mixture, the oil may be provided to components beyond VRF system 700 (e.g., indoor AHUs) which can result in a rapid loss of oil in VRF system 700. Accordingly, oil separators 704 can distill the oil from the fluid mixtures and provide the oil to accumulator 705 for temporary storage. Accumulator 705 can store the oil and can be accessed as needed to retrieve oil for other components of VRF system 700.

VRF system 700 is also shown to include strainers 706, a distributor 707, reversing valves 708, capillary tubes 709, and micro-computer control expansion valves 710. Strainers 706 can remove impurities (e.g., dirt, debris, etc.) from the oil and/or the oil/refrigerant mixture that may be accidentally integrated with the oil and/or oil/refrigerant mixture during operation of VRF system 700. Impurities can result in poor functioning of building equipment and may affect characteristics of the oil in VRF system 700 (e.g., by increasing or decreasing a viscosity of the oil). Distributor 707 can help in distributing fluids throughout heat exchanger 702. Reversing valves 708 can change a direction of refrigerant flow in VRF system 700 to switch VRF system 700 between heating and cooling modes. Capillary tubes 709 can assist in reducing a temperature of refrigerant in VRF system 700 by affecting a pressure of the refrigerant. Micro-computer control expansion valves 710 can regulate an amount of refrigerant entering components of VRF system 700.

VRF system 700 is also shown to include check valves 711, solenoid valves 712, check joints 713, a stop valve 714 for the liquid line, a stop valve 715 for the gas (low) line, a stop valve 716 for the gas (high/low) line, a refrigerant pressure sensor 717, another refrigerant pressure sensor 718, and high pressure switches 719. Check valves 711 can help ensure that fluid is flowing in a correct direction within VRF system 700 by restricting the fluid from flowing in a direction opposite a desired direction of flow. Solenoid valves 712 can regulate a flow of fluids in VRF system 700. Check joints 713 can help regulate stress on components of VRF system 700. Stop valves 714, 715, and 716 can restrict a flow of fluid in the liquid line, the gas (low) line, and the gas (high/low) line shown in the illustration of FIG. 7A, respectively. With regard to refrigerant pressure sensors 717 and 718, refrigerant pressure sensor 717 may be a high pressure sensor whereas refrigerant pressure sensor 718 may be a low pressure sensor within VRF system 700. As refrigerant returns to compressors 701, high pressure switches 719 can stop the refrigerant from entering compressors 701 if a pressure of the refrigerant is too high or too low in order to prevent damage to compressors 701.

VRF system 700 is also shown to include a variety of thermistors. In VRF system 700, a resistance across a thermistor can be primarily based on a temperature of a connected component. In the illustration of FIG. 7A, VRF system 700 is shown to include thermistors 720-725. Thermistor 720 is associated with an upper side of first compressor 701. Thermistor 721 is associated with an upper side of second compressor 701. Thermistor 722 is associated with a gas side of heat exchanger 702. Thermistor 723 is associated with a liquid side of heat exchanger 702. Thermistor 724 is associated with a subcooler bypass side. Thermistor 725 is associated with an auto charge of refrigerant.

Each pipe in VRF system 700 is also labeled with a corresponding outer diameter OD and a thickness T which are given below in Table A. As should be noted, the material used in VRF system 700 across all piping is C1220T-O.

TABLE A

Outer Diameter and Thickness of Piping

| Mark | ODxT | Material |
|---|---|---|
| a | 1 - 3/32 × 0.075<br>[28.0] × [1.9] | C1220T-O |

TABLE A-continued

Outer Diameter and Thickness of Piping

| Mark | ODxT | Material |
|---|---|---|
| b | 1 - 3/32 × 0.063<br>[28.0] × [1.6] | |
| c | 1 × 0.071<br>[25.4] × [1.8] | |
| d | 1 × 0.047<br>[25.4] × [1.2] | |
| e | 7/8 × 0.059<br>[22.0] × [1.5] | |
| f | 7/8 × 0.047<br>[22.0] × [1.2] | |
| g | 3/4 × 0.065<br>[19.05] × [1.65] | |
| h | 5/8 × 0.047<br>[15.88] × [1.2] | |
| i | 1/2 × 0.039<br>[12.7] × [1.0] | |
| j | 3/8 × 0.031<br>[9.52] × [0.8] | |
| k | 1/4 × 0.042<br>[6.35] × [1.07] | |
| l | 1/4 × 0.028<br>[6.35] × [0.7] | |

Figure 7B:
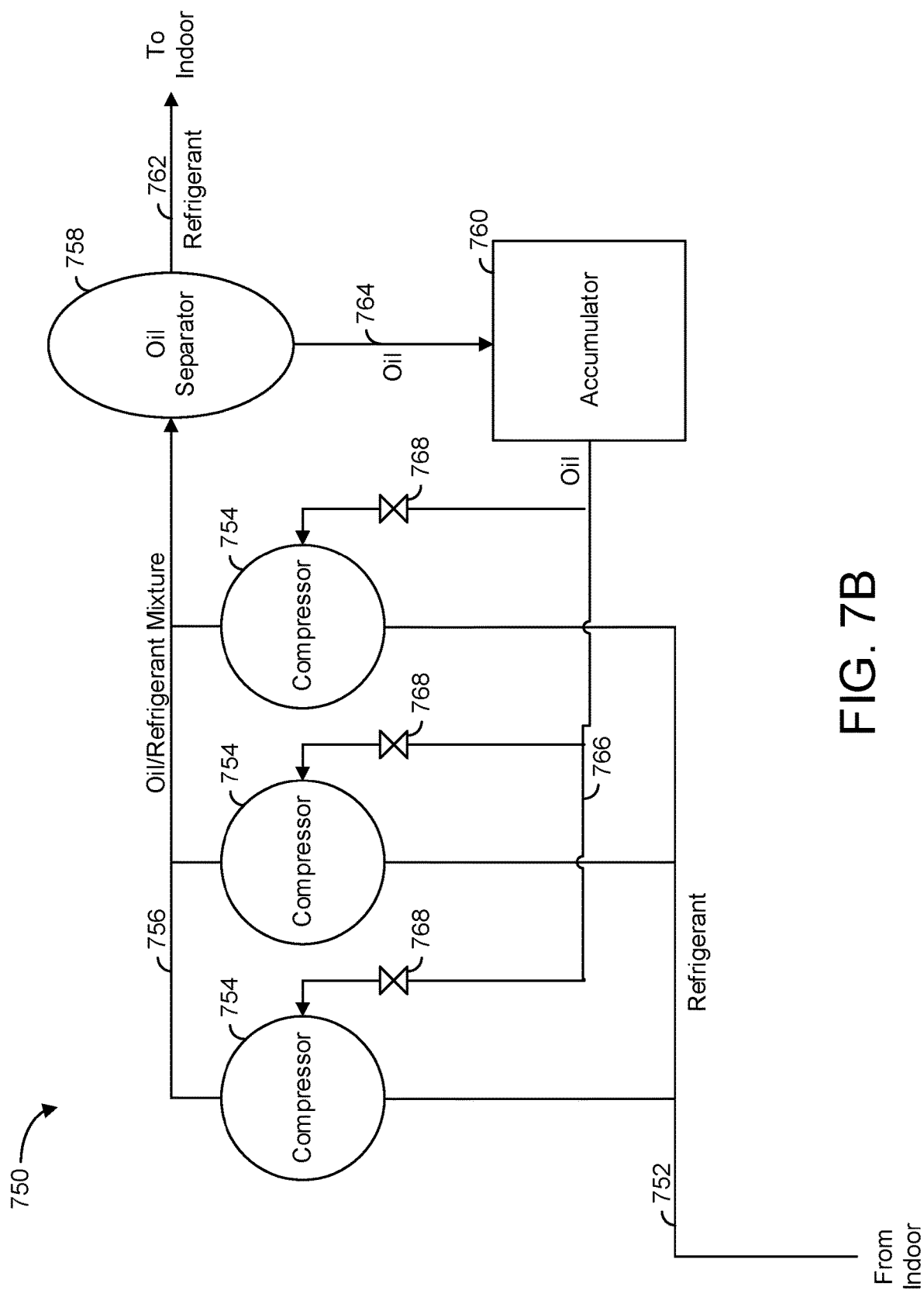
FIG. 7B is a block diagram of a VRF system, according to some embodiments.

Referring now to FIG. 7B, an illustration of a VRF system 750 is shown, according to some embodiments. In some embodiments, VRF system 750 is similar to and/or the same as VRF system 700 as described with reference to FIG. 7 and/or VRF system 600 as described with reference to FIGS. 6A and 6B. Specifically, VRF system 750 illustrates a flow of oil throughout a VRF system. As with VRF system 700, VRF system 750 is provided purely for sake of example. The components, structure, and/or other characteristics of VRF system 750 can be customized and configured dependent on implementation.

VRF system 750 is shown to include a suction line 752. Suction line 752 can provide refrigerant (e.g., refrigerant vapor) used by one or more devices/systems (e.g., an indoor unit) to compressors 754. In some embodiments, some oil may be included in fluid provided to compressors 754 by suction line 752. Based on the received refrigerant, compressors 754 can operate to compress the refrigerant into a higher pressure gas and output said higher pressure gas via a discharge line 756. As compressors 754 may require oil to function properly, the compression process performed by compressors 754 may result in some oil getting mixed into the outputted high pressure gas, thereby resulting in an oil/refrigerant mixture.

VRF system 750 is also shown to include an oil separator 758. Based on the received oil/refrigerant mixture, oil separator 758 can operate to separate the oil from the refrigerant. After separation, the refrigerant can be provided to some device/system (e.g., an indoor unit) via a refrigerant line 762. The separated oil can be provided to an accumulator 760 via an oil line 764. Accumulator 760 can function as a storage container for oil separated by oil separator 758. Accumulator 760 may have some maximum capacity that defines a maximum amount of oil that can be stored in accumulator 760.

Oil stored by accumulator 760 can be provided back to compressors 754 via an oil return line 766. Given that accumulator 760 has some non-zero amount of stored oil, accumulator 760 can provide the oil to any of compressors 754 if a particular compressor 754 requires more oil. In some embodiments, VRF system 750 includes valves 768 that regulate a flow of oil to compressors 754. In this case, valves 768 may prevent too much oil from being provided to compressors 754 and/or otherwise regulate oil being provided to compressors 754.

In some embodiments, refrigerant levels in the VRF system 750 are estimated/predicted by an AI model. In this case, the AI model may take in inputs such as an operating speed of compressors 754, a suction temperature and suction pressure of suction line 752, a discharge temperature and discharge pressure of discharge line 756, a valve position, a pipe length (e.g., conduit length, etc.), etc. These inputs may be measured by sensors (e.g., temperature sensors, pressure sensors, etc.) throughout VRF system 750 and/or may be directly provided by components of VRF system 750 (e.g., compressors 754 may directly output their operating speeds).

Based on the inputs, the AI model may predict characteristics of the refrigerant (e.g., refrigerant levels, etc.) in the VRF system 750. In some embodiments, the AI model uses the predicted characteristics to predict additional characteristics of the VRF system 750 (e.g., the optimal amount of refrigerant to be charged based on an automatic refrigerant charge mode, the operating states of the devices of the VRF system 750 based on a refrigerant leak detection mode, etc.). If the characteristics of the refrigerant and/or the VRF system 750 do not meet predefined thresholds (or some other constraint), one or more corrective action may be initiated to address the failure of the refrigerant characteristics and/or the VRF system 750 to meet the predefined thresholds. For example, if the refrigerant levels in the VRF system 750 are too low, a corrective action (e.g., refrigerant charge, etc.) may be initiated to operate a specific compressor 754, a specific valve (e.g., valves 711-716), etc. such that the VRF system 750 may receive more refrigerant at a specific time that results in a relatively low impact to efficiency of VRF system 750. Similarly, if the refrigerant levels in the VRF system 750 are too low, another corrective action (e.g., leak maintenance, etc.) may be initiated to operate components of the VRF system 750 such that the VRF system 750 may be repaired to correct a leak, resulting in a relatively low impact to the efficiency of the VRF system 750. The AI models and corrective actions that can be initiated are described in greater detail below with reference to FIGS. 8-10.

In other embodiments, the liquid levels in each of compressors 754, the accumulator 760, and/or other components of the VRF system 750 are estimated/predicted by an AI model. In this case, the AI model may take in inputs such as an operating speed of compressors 754, a discharge temperature and discharge pressure of discharge line 756, a suction pressure of suction line 752, a temperature of the refrigerant vapor and/or a temperature of other gas within VRF system 750 (e.g., a sub cooling temperature of the VRF system 750, etc.), an ambient temperature near VRF system 750 (e.g., a dry bulb temperature of the VRF system 750, etc.), a charge volume of the refrigerant (e.g., an estimated charge volume of the refrigerant, etc.), etc. The inputs may be measured by sensors (e.g., temperature sensors, pressure sensors, etc.) throughout VRF system 750, may be directly provided by components of VRF system 750 (e.g., compressors 754 may directly output their operating speeds), and/or may be estimated/predicted by an AI model.

Based on the inputs, the AI model may predict characteristics of the liquid (e.g., refrigerant levels in the accumulator 760, oil levels in the accumulator 760, oil-refrigerant mixture levels in the accumulator 760, etc.) in VRF system 750. If the characteristics of the liquid do not meet predefined thresholds (or some other constraint), one or more corrective action may be initiated to address the failure of the liquid characteristics to meet the predefined thresholds. For example, if an liquid level in the accumulator 760 is too high, a corrective action may be initiated to operate the accumulator 760, a specific valve 768, etc. such that the accumulator 760 may return liquid (e.g., oil to the compressor 754, etc.) at a specific time that results in a relatively low impact to efficiency of VRF system 750. The AI models and corrective actions that can be initiated are described in greater detail below with reference to FIGS. 11-13.

Systems and Methods for Refrigerant Estimation

Figure 8:
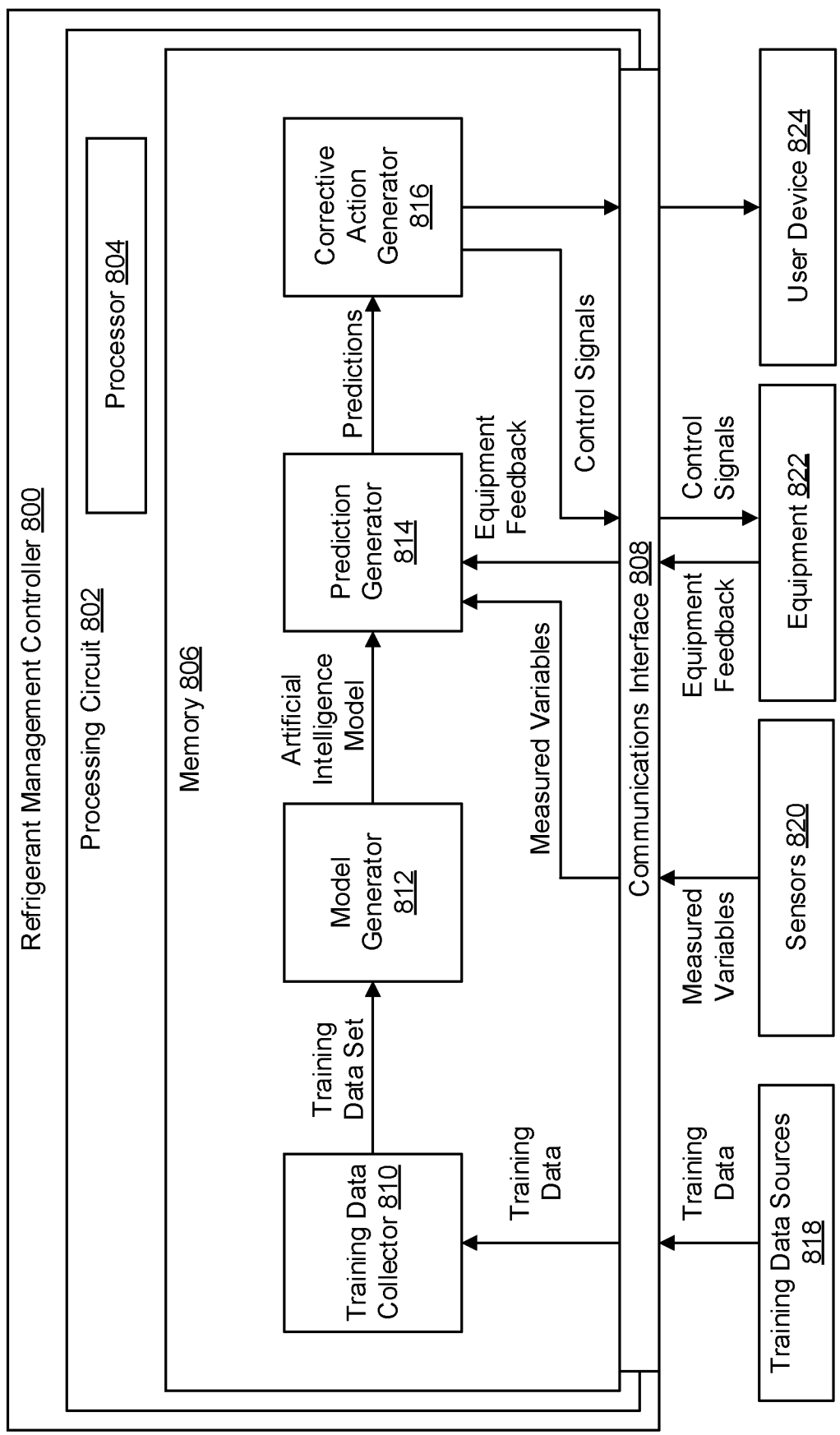
FIG. 8 is a block diagram of a controller for predicting refrigerant characteristics, according to some embodiments.
Figure 9A:
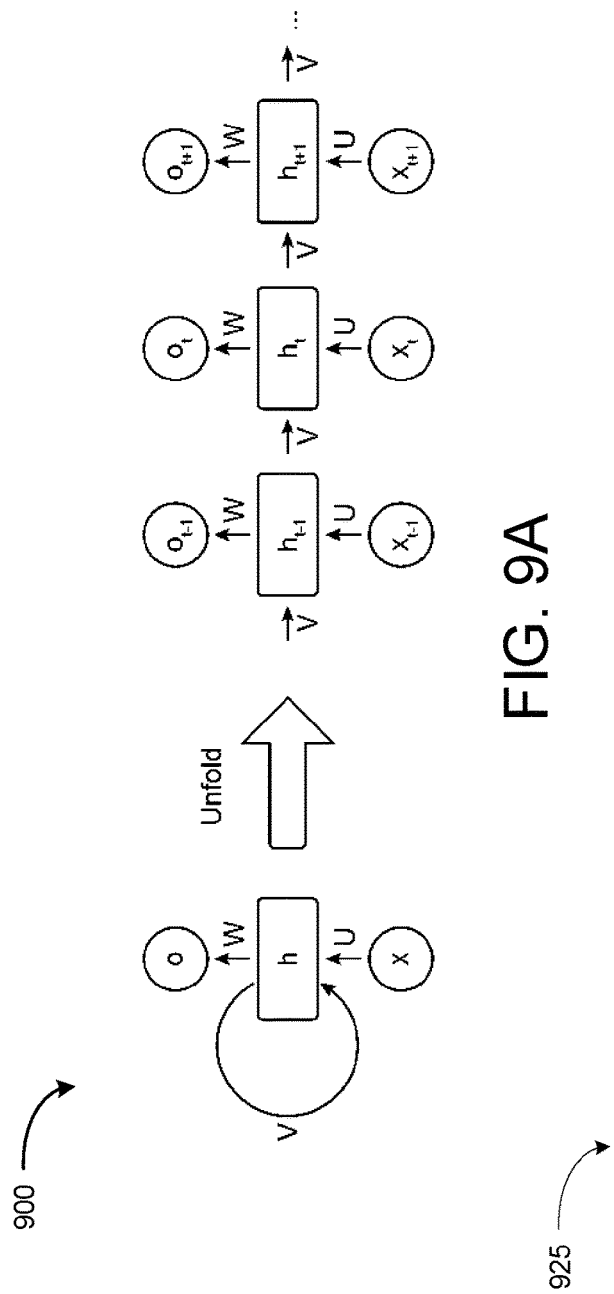
FIG. 9A is an illustration of a recurrent neural network structure, according to some embodiments.
Figure 9B:
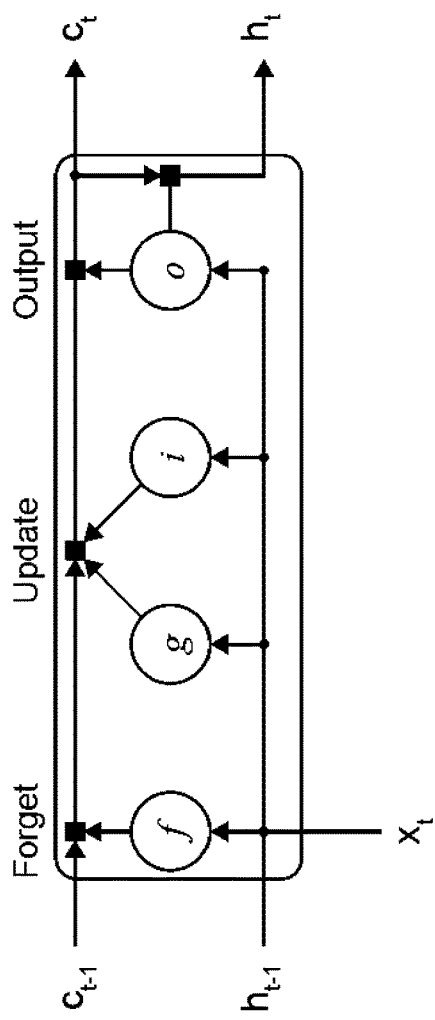
FIG. 9B is an illustration of a long short-term memory model structure, according to some embodiments.
Figure 9C:
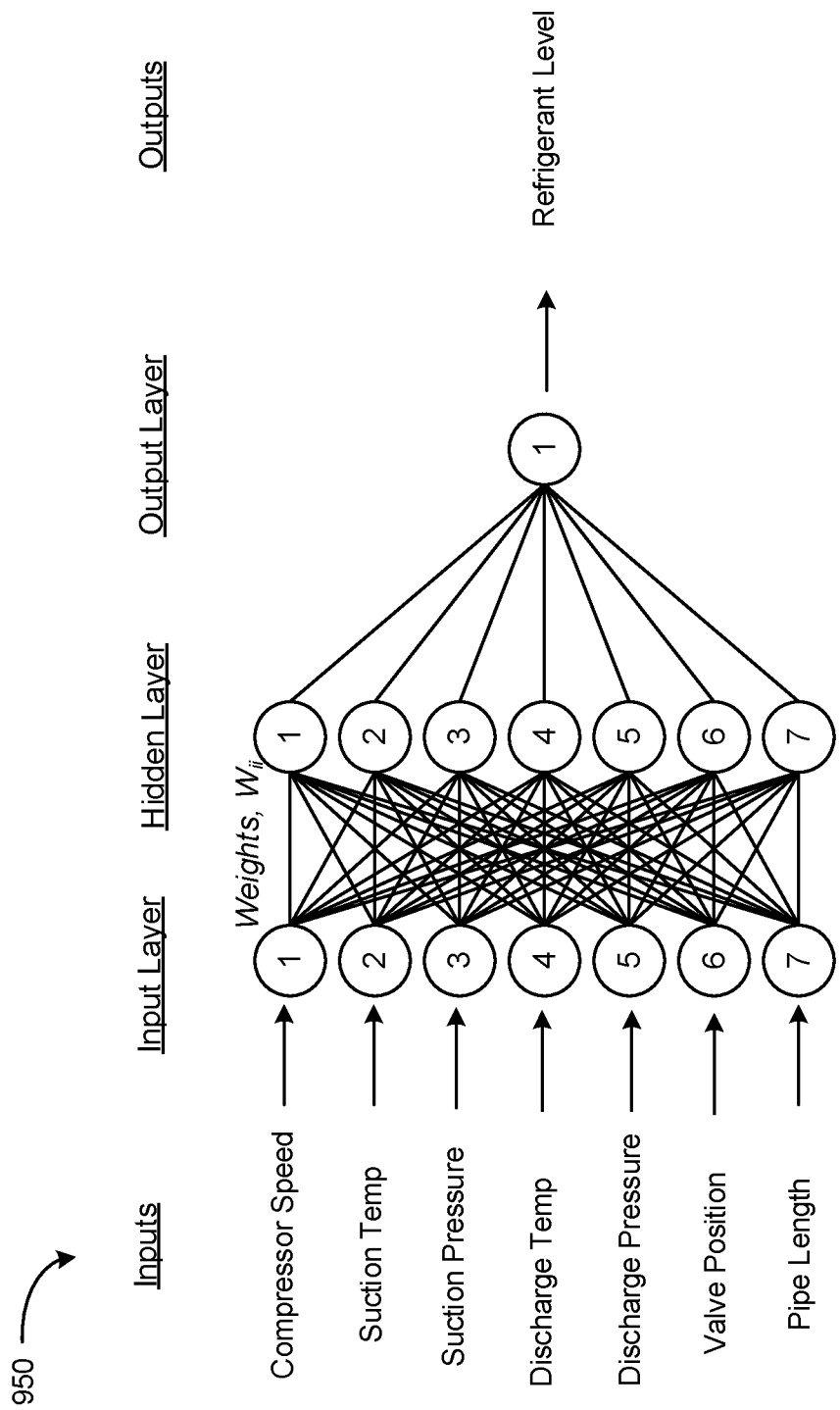
FIG. 9C is an illustration of a neural network (NN) architecture, according to some embodiments.
Figure 10:
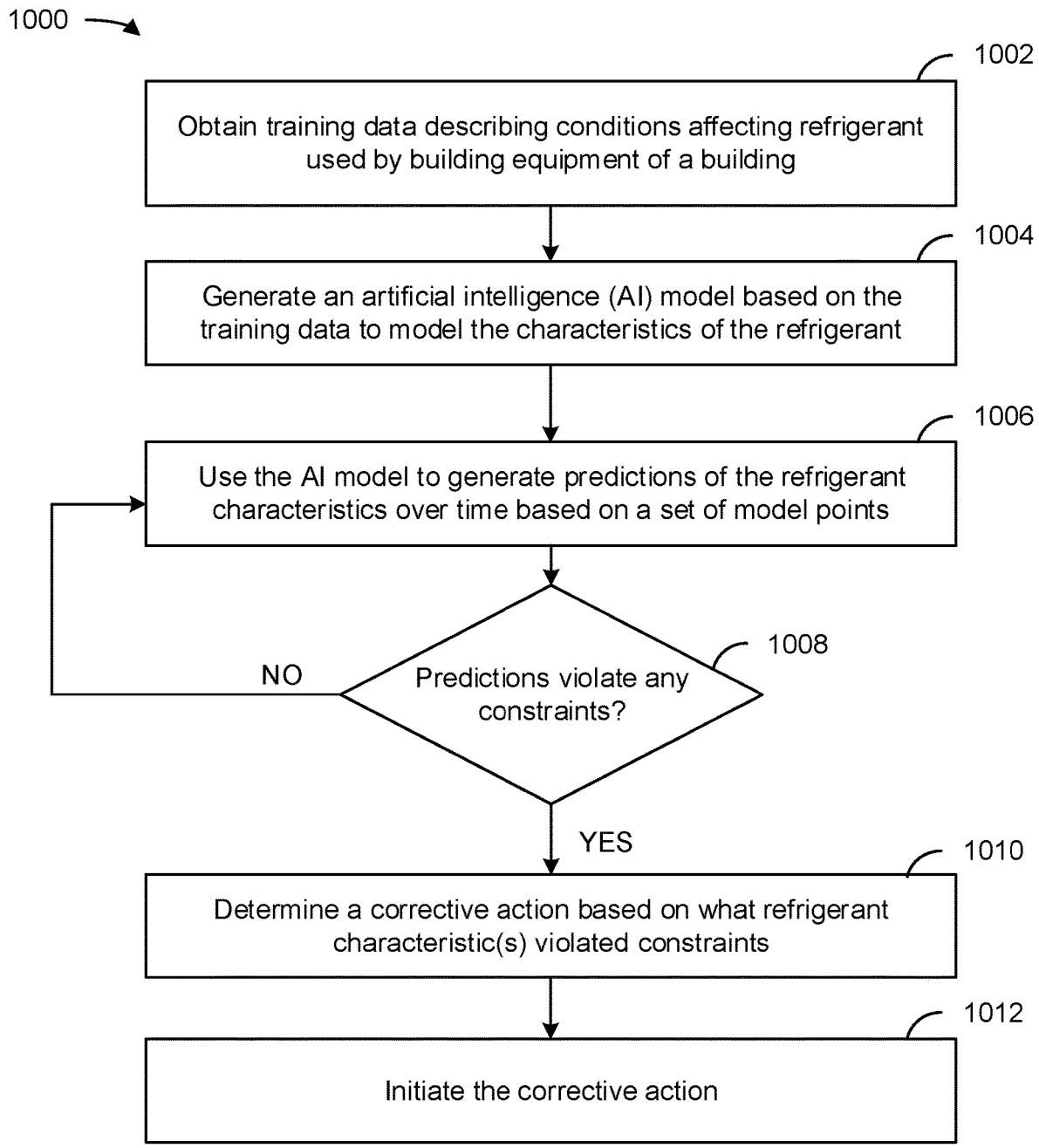
FIG. 10 is a flow diagram of a process for monitoring refrigerant characteristics using an AI model, according to some embodiments.

Referring generally to FIGS. 8-10, systems and methods for estimating and predicting refrigerant characteristics in a VRF system are shown and described, according to some embodiments. It should be appreciated that the description below is described with reference to a VRF system for sake of example only and should not be regarded as limiting. The systems and methods described throughout FIGS. 8-10 can be similarly applied to a variety of systems that utilize refrigerant (e.g., other building systems, fire systems, etc.) and are not meant to be limited to VRF systems.

The systems and methods described below can utilize artificial intelligence (AI) models to predict how characteristics of the refrigerant change over time based on a variety of inputs. The AI models can include any appropriate type of AI model. For example, the AI models may be or include long short-term memory (LSTM) models, other types of recurrent neural networks (RNNs), convolutional neural networks (CNNs), etc. A type of AI model to utilize can be selected based on, for example, accuracy of a given AI model, what specific inputs/outputs are of consideration, user preferences, etc. In some embodiments, RNN models such as LSTM models are preferred due to the time-series nature of the refrigerant. It should be noted that machine learning models may be referred to herein as synonymous with AI models.

The AI model can be trained to predict certain refrigerant characteristics based on a set of training data. The training data may be provided by a variety of sources. For example, a user may provide a set of inputs including a variety variables that can help the AI model to determine how the refrigerant is being utilized in the VRF system and a corresponding set of outputs based on actual measured operating states of the system or a similar system. In this case, the inputs may include, for example, an operating speed of a compressor, a suction temperature and a suction pressure, a discharge temperature and a discharge pressure, a valve position, a pipe length (e.g., conduit length, etc.), etc. As defined herein, a suction pressure can refer to an intake pressure generated by the compressor during operation, a discharge temperature can refer to a temperature measure of a superheated refrigerant vapor in the VRF system, and a discharge pressure can refer to a pressure generated on an output side of the compressor. The outputs may include, for example, a level of a refrigerant, etc. The AI model can then be trained using the inputs and corresponding outputs to predict values of the outputs based on inputs. Of course, said inputs and outputs are given for sake of example and are not meant to be limiting as to possible inputs to the AI model.

In some embodiments, a simulation model is utilized to generate the training data used to train the AI model. Training data generated using the simulation model may be used separately or in addition to training data gathered from other sources (e.g., from measured states of an actual system). The simulation model can be constructed to simulate changes in refrigerant characteristics over time based on a variety of conditions. In other words, the simulation model can be constructed to digitally mimic operation of refrigerant characteristics in a VRF system. States of the simulation model (e.g., refrigerant level, etc.) can be manipulated to generate training data representing a wide variety of conditions. The simulation model may be executed multiple times to generate training data representing evolution of the system over time under a variety of different loads, using different building devices, under different weather/environmental conditions, at different times, etc. In terms of a VRF system, the simulation model may be, for example, a closed loop functional mock-up unit (FMU) model that may typically be used to operate the VRF system if no AI model is used. Advantageously, by utilizing a simulation model, large amounts of training data can be generated in shorter periods of time as compared to operating an actual system over time to generate training data. Moreover, the simulation model can be executed to generate training data representing fringe scenarios (e.g., in a heating mode, in a cooling mode, in an off mode, dangerously high loads, dangerous operating conditions, device faults, etc.) without subjecting an actual system to conditions that may be dangerous and may disrupt comfort of occupants in a real building.

Once trained based on a set of training data, the AI model can predict refrigerant characteristics based on the inputs. For example, the AI model may predict a refrigerant level. Based on the predicted refrigerant characteristics, a determination can be made whether the predicted refrigerant characteristics adhere to predefined thresholds (and/or other constraints) on values of the characteristics. The predefined thresholds can include any limitations on the values such as, for example, threshold values of the characteristics must be above or below, ranges of acceptable values of the characteristics, etc. If the values of the refrigerant characteristics meet the predefined thresholds, the VRF system can continue standard operation. However, if the values of the refrigerant characteristics do not meet the predefined thresholds, a corrective action can be generated and initiated. Corrective actions, as defined herein, can refer to any action taken to address one or more refrigerant characteristics not meeting some predefined constraint(s)/threshold(s). For example, corrective actions may be or include automatically providing and/or receiving refrigerant (e.g., charging the VRF system, etc.), automatically providing and/or receiving maintenance to a device of the VRF system (e.g., repairing a leak, rupture, break etc.), disabling certain building devices (e.g., devices of the VRF system, etc.), generating and transmitting a notification to a user device, scheduling a technician to perform maintenance on the VRF system and/or to replace the refrigerant, generating control signals and operating building equipment (e.g., VRF devices) based on the control signals, logging the threshold violation(s) to a database, etc. A corrective action to initiate can be determined based on a variety of factors such as what threshold is violated, an amount the threshold was violated (e.g., a difference between an actual value of the refrigerant characteristic and a threshold value), user preferences, and/or any other applicable consideration. Violation of a threshold refrigerant characteristic can also indicate a deficiency of the refrigerant in that the refrigerant is deficient of some desired property (e.g., a desired level, etc.). As described herein, a violation of a threshold can refer to when a value (e.g., a predicted value) is above the threshold in the case of a maximum value threshold, or is below the threshold in the case of a minimum value threshold.

Referring now to FIG. 8, a block diagram of a refrigerant management controller 800 for predicting characteristics of refrigerant is shown, according to some embodiments. In particular, the refrigerant management controller 800 may predict characteristics of refrigerant in a VRF system. However, refrigerant management controller 800 can be applied to a variety of other systems/devices (e.g., other HVAC systems, car systems, fire safety systems, etc.) that require refrigerant to properly operate. In some embodiments, the refrigerant management controller 800 and/or components therein are incorporated in BMS controller 366 as described with reference to FIGS. 3-4 and/or another controller. In some embodiments, the refrigerant management controller 800 is used to operate some and/or all of the VRF systems described throughout FIGS. 7A-7B.

Refrigerant management controller 800 is shown to include a communications interface 808 and a processing circuit 802. Communications interface 808 may include wired or wireless interfaces (e.g., jacks, antennas, transmitters, receivers, transceivers, wire terminals, etc.) for conducting data communications with various systems, devices, or networks. For example, communications interface 808 may include an Ethernet card and port for sending and receiving data via an Ethernet-based communications network and/or a Wi-Fi transceiver for communicating via a wireless communications network. Communications interface 808 may be configured to communicate via local area networks or wide area networks (e.g., the Internet, a building WAN, etc.) and may use a variety of communications protocols (e.g., BACnet, IP, LON, etc.).

Communications interface 808 may be a network interface configured to facilitate electronic data communications between the refrigerant management controller 800 and various external systems or devices (e.g., equipment 822, sensors 820, a user device 824, etc.). For example, the refrigerant management controller 800 may receive equipment feedback from equipment 822 via communications interface 808.

Processing circuit 802 is shown to include a processor 804 and memory 806. Processor 804 may be a general purpose or specific purpose processor, an application specific integrated circuit (ASIC), one or more field programmable gate arrays (FPGAs), a group of processing components, or other suitable processing components. Processor 804 may be configured to execute computer code or instructions stored in memory 806 or received from other computer readable media (e.g., CDROM, network storage, a remote server, etc.).

Memory 806 may include one or more devices (e.g., memory units, memory devices, storage devices, etc.) for storing data and/or computer code for completing and/or facilitating the various processes described in the present disclosure. Memory 806 may include random access memory (RAM), read-only memory (ROM), hard drive storage, temporary storage, non-volatile memory, flash memory, optical memory, or any other suitable memory for storing software objects and/or computer instructions. Memory 806 may include database components, object code components, script components, or any other type of information structure for supporting the various activities and information structures described in the present disclosure. Memory 806 may be communicably connected to processor 804 via processing circuit 802 and may include computer code for executing (e.g., by processor 804) one or more processes described herein. In some embodiments, one or more components of memory 806 are part of a singular component. However, each component of memory 806 is shown independently for ease of explanation.

Memory 806 is shown to include a training data collector 810. Training data collector 810 can collect training data used to train an artificial intelligence model from one or more training data sources 818. Specifically, training data collector 810 can obtain training data associated with characteristics of refrigerant in a VRF system. In some embodiments, training data collector 810 transmits queries to training data sources 818 to obtain the training data. In some embodiments, training data collector 810 may passively receive training data from training data sources 818 without needing to actively request the training data.

Training data sources 818 can include any source of data that can store and/or provide training data to training data collector 810. For example, training data sources 818 may be or include a user device (e.g., a laptop, a desktop computer, a mobile device, a tablet, etc.) that can provide a stored training data set (e.g., usage data, etc.) to training data collector 810. As another example, training data sources 818 may be or include a database (e.g., a cloud database) that stores data associated with utilizing a standard VRF plant model with additional outputs of refrigerant levels. In said example, the VRF plant model may be the standard model used to operate the VRF system. In this way, the training data can include measurements from the VRF system in actual operation along with measurements of the refrigerant characteristics.

In some embodiments, training data collector 810 utilizes a simulation model to generate some or all of the training data used by model generator 812 to generate an AI model. The simulation model can model how an actual system may operate under various conditions (e.g., weather conditions, heating/cooling loads, device limitations, etc.) and how the refrigerant in the system may be consumed and/or otherwise change over time. In this way, training data collector 810 may not need to retrieve training data from training data sources 818 and instead can generate the training data within the refrigerant management controller 800. In some embodiments, the simulation model is hosted by a third party controller/device/system (e.g., a cloud computing system) which can provide the training data generated as a result of running the simulation model to the refrigerant management controller 800. In any case, the simulation model can be used/executed to generate a variety of training data representing various operating conditions of a system utilizing refrigerant in shorter periods of time as compared to waiting for an actual system to generate training data through operation. Moreover, the simulation model can be executed to generate training data illustrative of fringe scenarios that may be dangerous for an actual system to operate under purely for the sake of generating training data (e.g., a VRF system in a heating mode, a cooling mode, an off mode, etc.).

Based on the obtained training data, training data collector 810 can combine the collected training data into a training data set and provide the training data set to a model generator 812. Based on the training data set, model generator 812 can generate an AI model that models refrigerant characteristics over time. Specifically, model generator 812 can train the AI model to predict refrigerant characteristics based on specified inputs. For example, model generator 812 may train the AI model to predict values of refrigerant in one or more compressors, refrigerant in an accumulator, refrigerant levels in a VRF system when the VRF system is in a heating mode, a cooling mode, and/or an off mode, an ambient temperature, a discharge temperature, a suction pressure, a discharge pressure, and a gas temperature.

The AI model generated by model generator 812 can be any of a variety of AI model structures. In some embodiments, the AI model is an RNN model such as an LSTM model. In this case, for the RNN to properly work on the VRF system, an original FMU plant model can be utilized to generate enough simulation data for RNN model to analyze and be trained based on. With training time increasing, the final RNN model may have much closer function as the original plant model. Some advantages of using RNN models in particular is that they may be faster and have a higher stability as compared with the FMU plant model. Further, the trained RNN model may reduce the influence of the refrigerant characteristics and improve the efficiency of the VRF system. With particular regard to LSTM models, an LSTM model is an artificial RNN used for deep learning. LSTM models can classify and process entire sequences of time series data and can make predictions even with lags of unknown duration between important events in a time series. An LSTM model generated by model generator 812 may include various structures depending on implementation. For example, an LSTM model generated by model generator 812 may include one sequence input layer, one drop out layer, two fully connected layers, and two LSTM layers.

In some embodiments, the AI model is a CNN model. In this case, the CNN model may include, for example, an input layer, multiple hidden layers (e.g., rectified linear unit layers, pooling layers, fully connected layers, normalization layers, etc.), an output layer, etc. In some embodiments, the AI model follows some other artificial intelligence model architecture. Example architectures of the AI model are described in greater detail below with reference to FIGS. 9A-9C.

Model generator 812 may utilize a variety of training techniques to generate the AI model. For example, model generator 812 may utilize a stochastic gradient descent with momentum approach, an adaptive moment estimation approach, a root mean square propagation approach, etc. With specific regard to the root mean square propagation approach, model generator 812 may utilize a root mean squared error (RMSE) to measure how accurate model predictions are to the training data provided by training data collector 810. Specifically, model generator 812 may monitor the RMSE over time based on the following equation:

$$RMSE = \sqrt{(Y_{pred,t} - Y_{test,t})^2}$$

where $Y_{pred,t}$ is a previous prediction of the AI model for a variable Y at a time step t, and $Y_{test,t}$ is an actual value of the variable Y as indicated by the training data at time step t. The calculation of $(Y_{pred,t} - Y_{test,t})^2$ can be performed for each time step t=1 ... n where n is a total number of predictions. Each difference can then be averaged together. During the training process, model generator 812 can refine the AI model to reduce the RMSE.

Model generator 812 can provide the generated AI model to a prediction generator 814. Prediction generator 814 can use the AI model to generate predictions of refrigerant characteristics over time. In order to generate said predictions, prediction generator 814 can operate to obtain values of inputs required by the AI model from a variety of sources. For example, prediction generator 814 may obtain equipment feedback from equipment 822, measured variables from sensors 820, and/or any other appropriate source of input values.

Equipment 822 can be or include any devices that can provide input data needed by the AI model. For example, in a VRF system, equipment 822 may include compressors, a heat exchanger, an accumulator, a valve, etc., that can provide usage data (e.g., a compressor speed, suction temperature, suction pressure, discharge temperature, discharge pressure, valve position, fluid conduit length, etc.) to the refrigerant management controller 800. More particularly, if the AI model requires a compressor speed as an input, equipment 822 may include one or more compressors that can provide an operating speed as equipment feedback to prediction generator 814.

Sensors 820 may be or include a variety of sensors that can measure values of inputs (i.e., variables) that are required by the AI model. For example, sensors 820 may include pressure sensors that measure a suction pressure and/or a discharge pressure. As another example, sensors 820 may include temperature sensors that measure a discharge temperature, an ambient temperature, and/or a gas temperature. As yet another example, sensors 820 may include position sensors that measure the position of a valve, length of a pipe (e.g., conduit, etc.), and/or orientation of other components of a VRF system.

Based on the AI model and the obtained input values, prediction generator 814 can generate refrigerant characteristic predictions by passing the obtained input values through the AI model. As a result of passing the obtained input values through the AI model, the AI model can output values of one or more refrigerant characteristics (e.g., refrigerant level, etc.). In this way, characteristics of the refrigerant in the VRF system can be estimated without the need for additional sensors to measure the refrigerant characteristics.

In some embodiments, prediction generator 814 generates predictions regarding multiple stages within a VRF system. For example, prediction generator 814 may generate a prediction of refrigerant levels of a compressor, an accumulator, or other devices of a VRF system when the VRF system is in a certain mode (e.g., heating mode, cooling mode, off mode, etc.). In some embodiments, the prediction generator 814 also predicts an optimal amount of refrigerant to be provided (e.g., charged) and/or predicts the operating states of devices of the VRF system. In said example, predicting the refrigerant levels, the optimal amount of refrigerant to be provided, and/or the operating states of devices of the VRF system may benefit certain corrective actions (e.g., an amount of refrigerant to add/remove from the VRF system, a device of the VRF system to be repaired, etc.). By generating predictions regarding refrigerant at multiple stages within the VRF system, refrigerant deficiencies can be predicted and tracked over time throughout the VRF system rather than at a single point of the VRF system.

Prediction generator 814 can provide the predictions of the refrigerant characteristics to a corrective action generator 816. Corrective action generator 816 can analyze the predicted refrigerant characteristics to determine if any corrective actions should be initiated and what corrective actions to initiate. As defined above, a corrective action can refer to any action taken to address a refrigerant characteristics not meeting some predefined threshold(s). Corrective actions may include, for example, providing and/or receiving refrigerant (e.g., charging the VRF system, etc.), providing and/or receiving maintenance to a device of the VRF system (e.g., repairing a leak, rupture, break, etc.), providing and/or receiving refrigerant at a component of the VRF system (e.g., return refrigerant to an outdoor VRF unit, etc.), distributing notifications/alerts to user device 824 to indicate to a user that certain refrigerant characteristics are violating the predefined thresholds, operating equipment 822, disabling equipment 822, automatically scheduling a maintenance activity to be performed on equipment 822, logging the threshold violation in a database, etc. The predefined threshold(s) can be defined by a user, provided by a manufacturer, estimated based on operating states of equipment in the VRF system, etc. For example, a user or manufacturer may define a lowest amount of refrigerant that the VRF system should be operated with. In this case, low refrigerant levels may result in more rapid deterioration of the compressors. As should be appreciated, thresholds defined for refrigerant characteristics can be obtained from a variety of sources (e.g., manufacturers, users, based on predictions, etc.) and can include a variety of limitation types (e.g., ranges, threshold values, exact values to which characteristics should be equal, etc.).

As a more specific example, consider a scenario where the AI model predicts values of refrigerant characteristics including a refrigerant level in a compressor, a refrigerant level in an accumulator, and/or a refrigerant level in a VRF system. In the example, corrective action generator 816 may determine whether the refrigerant levels in the compressor, accumulator, and/or VRF system are above a first minimum threshold value, a second minimum threshold value, and/or a third minimum threshold value, respectively. If the refrigerant level in the compressor is below the first minimum threshold value, corrective action generator 816 may determine the VRF system should retrieve refrigerant from an external source and/or repair the compressor. If the refrigerant level in the accumulator is below the second minimum threshold value, corrective action generator 816 may determine the VRF system should retrieve refrigerant from an external source and/or repair the accumulator. Similarly, if the refrigerant level in the VRF system (e.g., a device, a line, a pipe or conduit, etc.) is below the third minimum threshold value, corrective action generator 816 may determine the VRF system should retrieve refrigerant from an external source and/or repair a device of the VRF system. In some embodiments, refrigerant is added (e.g., retrieved, provided, etc.) automatically by components of the VRF system. In other embodiments, refrigerant is added to the VRF system by a user manually.

In some embodiments, corrective action generator 816 compares outputs of the AI model over time to determine if certain refrigerant characteristics are approaching a threshold violation and will thereby include a deficiency. In this case, corrective action generator 816 may compare the values of the refrigerant characteristics outputted by the AI model to previous outputted values of the refrigerant characteristics. If a particular refrigerant characteristic is trending towards violating a threshold, corrective action generator 816 may preemptively initiate a corrective action prior to the violation occurring. For example, if a refrigerant level is decreasing over time and, based on a current trend, will fall below a minimum refrigerant level threshold within an upcoming time period, corrective action generator 816 may initiate a corrective action (e.g., add refrigerant, repair a device, etc.) prior to the refrigerant level falling below the minimum threshold. Advantageously, preemptive initiation of corrective actions can ensure that an amount of time that equipment (e.g., compressors) is operated under conditions associated with violations of refrigerant characteristic thresholds is reduced. Reducing said amount of time can likewise reduce degradation of the equipment, reduce energy consumption, and can provide other benefits.

In some embodiments, corrective action generator 816 predicts times to initiate certain corrective actions to reduce an impact on equipment 822 and/or other devices/systems. For example, corrective action generator 816 may predict a time to initiate adding refrigerant to reduce a negative impact on heating/cooling loads required by a building. In some embodiments, corrective action generator 816 also predicts a time to temporarily disable equipment 822 such that additional refrigerant can be safely added to the system. Corrective action generator 816 may also predict a time to repair a device of the VRF system to reduce a negative impact on the equipment of the VRF system.

Corrective action generator 816 can utilize a variety of techniques to predict times at which to initiate certain corrective actions. For example, corrective action generator 816 may track certain variables over time and identify a lower range of values that may result in low amounts of disruption to a system. As a specific example, corrective action generator 816 may identify a range of values associated with low heating/cooling needs such that an impact on environmental conditions within a building will be reduced. Based on the identified range of values, corrective action generator 816 may track actual heating/cooling needs over time and, in response to identifying a time period where actual heating/cooling needs are within the identified range, can initiate a corrective action during said time period. In this way, corrective action generator 816 is effectively predicting a time period where initiating a corrective action results in a low overall impact.

In some embodiments, corrective action generator 816 can operate as a standard equipment controller in the case where no corrective actions are needed (e.g., if refrigerant level is at an appropriate value). In other words, corrective action generator 816 can generate control signals for equipment 822 in order to operate equipment 822 to affect some variable state or condition (e.g., temperature, humidity, etc.) within a building. In some embodiments, corrective action generator 816 is configured to set boundary conditions for equipment 822 based on the predictions provided by prediction generator 814. For example, corrective action generator 816 may set a maximum speed of compressors based on a prediction of refrigerant levels. In said example, if the refrigerant level is within an appropriate range and is not approaching a violation of the range, corrective action generator 816 may generate control signals to operate the compressors at a higher speed as the refrigerant level is appropriate.

As a result of initiating some corrective action, any violations of thresholds for refrigerant characteristics can be addressed. This can ensure that an amount of time during which equipment 822 is operating under conditions associated with some refrigerant characteristic violation is reduced (e.g., minimized). Overall, in a VRF system, initiating the corrective actions using predictions based on the AI model can save hardware cost, reduce an influence of refrigerant levels, and improve efficiency of the VRF system, among other benefits.

Referring now to FIG. 9A, an illustration of a recurrent neural network (RNN) structure 900 is shown, according to some embodiments. Specifically, RNN structure 900 can illustrate the structure of an RNN model (e.g., an LSTM model) that can be generated and utilized as the AI model described above with reference to FIG. 8.

RNNs are a class of artificial neural networks where connections between nodes form a directed graph along a temporal sequence. In the case of a VRF system, the RNN model represented by RNN structure 900 can be generated using simulation data collected based on an FMU plant model. As training time increases, the RNN model can have closer and closer function with the original plant model for the VRF system.

RNN structure 900 illustrates a condensed network structure and how the condensed network structure can be "unfolded" to illustrate how RNN structure 900 operates over a temporal sequence. Specifically, the condensed ("folded") structure and the unfolded structure are equivalent, with the unfolded structure illustrating usage of the RNN model over a temporal sequence in greater detail.

RNN structure 900 is shown to include an input represented as x which may be a vector including inputs required by the RNN model. For a VRF system, the input vector x may include, for example, a compressor speed, a suction temperature and a suction pressure, a discharge temperature and a discharge pressure, a valve position, a pipe length, etc. A weight vector U can be applied to x and a result provided to a hidden layer vector h. Similarly, a weight vector V can be applied to a hidden layer vector of a previous time step. Based on the weighted inputs and the weighted values of the previous hidden layer vector, a function can be applied to determine a corresponding output which, after a weight vector W is applied, can result in an output o. This process can be repeated for each time step of a temporal sequence. In other words, a new input vector $x_t$ can be obtained for a time step t and, based on $x_t$, a previous state $h_{t-1}$, and corresponding weight vectors U, V, and W, an output vector $o_t$ can be determined for time step t.

As a result of incorporating RNN structure 900 in the RNN model generated and used by the refrigerant management controller 800, predictions of the RNN model can be modified over time as a result of previous time steps. As refrigerant characteristics change over time a result of changing conditions (e.g., changing environmental conditions, operating conditions, etc.), utilizing the RNN model in particular can be useful due to the unique ability of the RNN model to account for changes over a temporal sequence, as opposed to being limited by an original training process as some other neural network architectures are.

Referring now to FIG. 9B, an illustration of an LSTM model structure 925 is shown, according to some embodiments. LSTM model structure 925 can illustrate how information is saved between time steps in an RNN. LSTM models are a specific artificial RNN architecture that can be used in the field of deep learning. LSTM models can classify and process entire sequences of time-series data and make predictions. Advantageously, LSTM models can generate prediction even with lags of unknown duration between important events in the time-series data. An LSTM model can include various layers such as, for example, a sequence input layer, one or more drop out layers, one or more fully connected layers, one or more LSTM layers, an output layer, etc.

As shown in FIG. 9B, LSTM model structure 925 includes functions f, g, i, and o which are used to generate outputs to the block shown in FIG. 9B. LSTM model structure 925 is further shown to include a forget gate, an update gate, and an output gate. The forget gate can be configured to eliminate non-relevant data from being considered and remembered for future time steps in a time sequence. The update gate can apply some operation to combine input information to account for changes in the data. Finally, the output gate can decide what information is passed as output to the next time step. LSTM model structure 925 can include multiple blocks that pass information associated with a particular time step in a time sequence to the next time step. Advantageously, this structure allows information to be retained and not lost between time steps, thereby increasing an accuracy of prediction for time-series data.

Referring now to FIG. 9C, an illustration of a neural network (NN) architecture 950 is shown, according to some embodiments. NN architecture 950 can describe a general architecture that may be utilized by the AI model described above with reference to FIG. 8 for a VRF system (e.g., VRF system 600). Specifically, NN architecture 950 can illustrate how a neural network can generate a set of outputs based on a set of inputs related to the VRF system. It should be noted, however, that NN architecture 950 is provided purely for sake of example of a neural network architecture that can be utilized and is not meant to be limiting on neural network architectures that can be utilized by the AI model described with reference to FIG. 8.

NN architecture 950 is shown to include input nodes in an input layer that correspond to a set of inputs. NN architecture 950 is shown to receive a compressor speed, a suction temperature, a suction pressure, a discharge temperature, a discharge pressure, a valve position, and a pipe length as inputs. Each input can be associated with a particular input node of an input layer in NN architecture 950. In other words, a number of nodes in the input layer may correspond to a number of actual inputs as a one-to-one relationship. It should be appreciated that the inputs shown in FIG. 9C are provided purely for sake of example. NN architecture 950 can be modified to account for various different inputs depending on implementation. For example, if compressor speed is not accounted for as an input, the input layer may only include five input nodes.

NN architecture 950 is also shown to include a hidden layer including hidden nodes. In NN architecture 950, the hidden layer is shown to include a single layer including a number of hidden nodes that is equivalent to the number of input nodes of the input layer. However, it should be noted that, according to various embodiments, the hidden layer can include one or more layers including varying numbers of hidden nodes that may or may not correspond to a number of input nodes. For example, in a convolutional neural network architecture, NN architecture 950 may include multiple hidden layers (e.g., multiple convolutional layers) that have varying numbers of hidden nodes. Moreover, the nodes of each layer need not necessarily connect to every node of adjacent layers as shown in FIG. 9C.

In NN architecture 950, a weight W can be applied with regard to connections between two nodes. In some embodiments, each connection between nodes includes a particular value for a particular connection. For example, a weight between input node 1 of the input layer and hidden node 1 of the hidden layer may be different from a weight between input node 1 and hidden node 2 of the hidden layer. In some embodiments, various connections between nodes may be associated with the same weight. For example, in an LSTM-specific architecture, the weights associated with connections between input nodes and hidden nodes may be the same.

Based on each weighted value incoming to a particular node, a function can be applied to determine a composite value of the node. For example, for hidden node 1 of NN architecture 950, a function can be applied to the weighted input values incoming to the node to determine a composite value of hidden node 1. Composite values of each node in a particular layer may determine outputs of the particular layer. The outputs of the particular layer can correspond with inputs to a subsequent layer along with weights between the particular layer and the subsequent layer. This process can be repeated for each layer until an output layer is reached.

NN architecture 950 is also shown to include an output layer including an output node. A number of output nodes in the output layer can correspond to desired outputs of the NN model on a one-to-one basis. With particular regard to the VRF system, the outputs may include refrigerant level of the VRF system, refrigerant level of a compressor, and/or refrigerant level of an accumulator, etc. Accordingly, an output node can correspond with the refrigerant level. With regard to NN architecture 950, a composite value of output node 1 can correspond to the refrigerant level. In this way, by simply providing the input values to NN architecture 950, predicted values of the output can be generated.

Referring now to FIG. 10, a flow diagram of a process 1000 for monitoring refrigerant characteristics using an AI model is shown, according to some embodiments. Process 1000 can leverage the AI model to predict values of the refrigerant characteristics and can initiate corrective actions if said values do not meet predefined thresholds. While process 1000 is described primarily with reference to a building system (e.g., a VRF system), process 1000 can be applied to a variety of systems that include components/devices that require refrigerant for proper operation. For example, process 1000 can be applied to VRF systems, other HVAC systems, fire safety systems, etc. In some embodiments, some and/or all steps of process 1000 are performed by the refrigerant management controller 800 as described with reference to FIG. 8.

At step 1002, training data describing conditions affecting refrigerant used by building equipment of a building is obtained, according to an exemplary embodiment. The building equipment can include a variety of devices that can affect a variable state or condition of the building and utilizes refrigerant for proper operation. For example, the building equipment may include components of a VRF system (e.g., compressors, accumulators, heat exchangers, etc.), AHUs, other subplants, etc. The training data can be obtained from a variety of sources, and may be of any suitable form (e.g., usage data, etc.). For example, the training data may include usage data obtained from components of a VRF system (e.g., compressors, an accumulator, etc.), components of a building (e.g., sensors, etc.), etc. The usage data may include, for example, a compressor speed, suction temperature, suction pressure, discharge temperature, discharge pressure, valve position, fluid conduit length, ambient temperature, etc. In some embodiments, the training data includes data obtained via direct input from a user, by accessing a database (e.g., a cloud database) storing historical information associated with operation of the equipment, from training data provided by a manufacturer of the building equipment, etc. In some embodiments, training data is obtained when the building equipment is in a specific mode (e.g., a heating mode, a cooling mode, an off mode, etc.).

In some embodiments, step 1002 includes generating the training data using a simulation model. If a simulation model is used, the simulation model can generate some and/or all of the training data obtained in step 1002. The simulation model can be structured to account for various aspects of the system including the building equipment such as, for example, how much refrigerant is used by devices of the building equipment during operation, how external weather conditions and/or other ambient conditions affect the system, various heating/cooling loads of the building, etc. During generation of the training data, variables associated with the simulation model can be manipulated to generate training data representing a variety of scenarios. Using the simulation model in step 1002 can result in a greater amount of training data being available in a shorter amount of time as compared to gathering data based on actual operation of the building equipment. Moreover, using the simulation model in step 1002 can help obtain training data describing fringe cases that may not be typically included in training data collected based on actual device operation (e.g., when a VRF system is in a heating mode, a cooling mode, an off mode, subject to dangerously high loads, dangerous operating conditions, etc.). In some embodiments, step 1002 is performed by training data collector 810.

At step 1004, an artificial (AI) model is generated based on the training data that models the characteristics of the refrigerant, according to an exemplary embodiment. The AI model can be of a variety of AI models such as, for example, an RNN model (e.g., an LSTM model), a CNN model, etc. The AI model can be generated to associate the conditions affecting the refrigerant and the refrigerant characteristics themselves. Specifically, the AI model may be trained to associate certain inputs (e.g., compressor speed, a suction temperature, a suction pressure, a discharge temperature, a discharge pressure, a valve position, a pipe length, etc.) with certain outputs (e.g., refrigerant level, etc.). In some embodiments, step 1004 may include training weights associated with connections between nodes of the AI model to account for relationships between the conditions and the characteristics of the refrigerant. In some embodiments, step 1004 is performed by model generator 812.

At step 1006, the AI model is used to generate predictions of the refrigerant characteristics over time based on a set of model inputs, according to an exemplary embodiment. As described above in step 1004, the AI model can be trained to associate certain inputs with certain outputs. Accordingly, once trained, the AI model can utilize values of the inputs to predict corresponding values of the outputs (i.e., the refrigerant characteristics). In some embodiments, step 1006 is performed by prediction generator 814.

At step 1008, it is determined whether the predictions violate any constraints, according to an exemplary embodiment. In some embodiments, the constraints are predefined constraints that define acceptable values of the refrigerant characteristics. For example, the constraints may include threshold values the refrigerant characteristics should be above/below, acceptable ranges of values the refrigerant characteristics should be within, etc. Specifically, the constraints may be thresholds that should not be violated. As a particular example, a constraint for refrigerant level may be defined as a minimum value that the refrigerant level should be above. In said example, if the predicted refrigerant level is below the minimum value, a violation may be identified. If the predicted refrigerant characteristics do not violate any constraints and therefore are not deficient (step 1008, "NO"), process 1000 may repeat starting at step 1006. In this case, a new set of predictions can be generated for a subsequent time step such that the refrigerant characteristics can be monitored/tracked over time. However, if a constraint violation is identified (step 1008, "YES"), process 1000 may proceed to step 1010. In some embodiments, a single constraint violation will result in process 1000 proceeding to step 1010. In some embodiments, multiple constraint violations (e.g., 2 constraint violations, 3 constraint violations, etc.) may be required for process 1000 to proceed to step 1010. In some embodiments, step 1008 includes at least partially accounting for a severity of particular constraint violations in determining whether to proceed to step 1010. For example, a refrigerant level falling below a minimum threshold value by a predetermined amount (e.g., 0.5 pounds, 1 pound, etc.) may require some other constraint to also be violated for process 1000 to proceed to step 1010, whereas the refrigerant level falling below the minimum value by another amount (e.g., 2.5 pounds, 5 pounds, etc.) may be independently sufficient for process 1000 to proceed to step 1010. In some embodiments, step 1008 may include predicting whether a refrigerant characteristic will violate a constraint within an upcoming time period, and if so, causes process 1000 to proceed to step 1010 to preemptively address the anticipated violation. In some embodiments, step 1008 is performed by corrective action generator 816.

At step 1010, a corrective action is determined based on what refrigerant characteristic(s) violated the constraint, according to an exemplary embodiment. In other words, the corrective action can be determined to address the particular refrigerant characteristic(s) that is/are violating one or more constraints/thresholds. For example, if a refrigerant level violates a constraint (e.g., a minimum allowable value), the corrective action determined may be to retrieve (e.g., charge, etc.) more refrigerant (e.g., automatically from a VRF system, a building management system, etc.). As another example, if a refrigerant level violates a constraint (e.g., a minimum allowable value), the corrective action determined may be to provide a maintenance activity to a device of the VRF system (e.g., repair a leak, rupture, etc. of a compressor, an accumulator, a valve, a pipe, etc.). In some embodiments, if the refrigerant level violates a constraint, the corrective action determined is to return refrigerant to components of the VRF system (e.g., return refrigerant to an outdoor VRF unit from an indoor VRF unit, etc.). In other embodiments, if the refrigerant level violates a constraint, the corrective action determined is to transmit a notification to a user device to notify the user that servicing of the building equipment may be necessary to adjust the refrigerant level. In some embodiments, step 1010 includes determining a specific time and/or time period for the corrective action to occur. To determine the specific time and/or time period, step 1010 may include monitoring conditions (e.g., operating conditions of devices, ambient conditions, etc.) of the system to determine a time at which a lowest impact on cost, heating/cooling efficiency, etc. may occur. In some embodiments, if the corrective action is transmitting a notification, or if the constraint violation is severe, the determined time and/or time period may be a soonest possible time (e.g., immediately). In some embodiments, step 1010 is performed by corrective action generator 816.

At step 1012, the corrective action is initiated, according to an exemplary embodiment. By initiating the corrective action determined in step 1010, the one or more constraint/threshold violations identified in step 1008 can be addressed. In this way, an overall amount of time during which the one or more constraint/threshold violations are active can be reduced. Reducing an amount of time during which constraints/thresholds are violated can help reduce degradation of the building equipment, reduce costs (e.g., energy costs), and can increase overall safety of the system, among other benefits. In some embodiments, if step 1010 includes determining when the corrective action should be performed, step 1012 can include initiating the corrective action at the determined time. In some embodiments, step 1012 is performed by corrective action generator 816.

Systems and Methods for VRF Liquid Estimation

Figure 11:
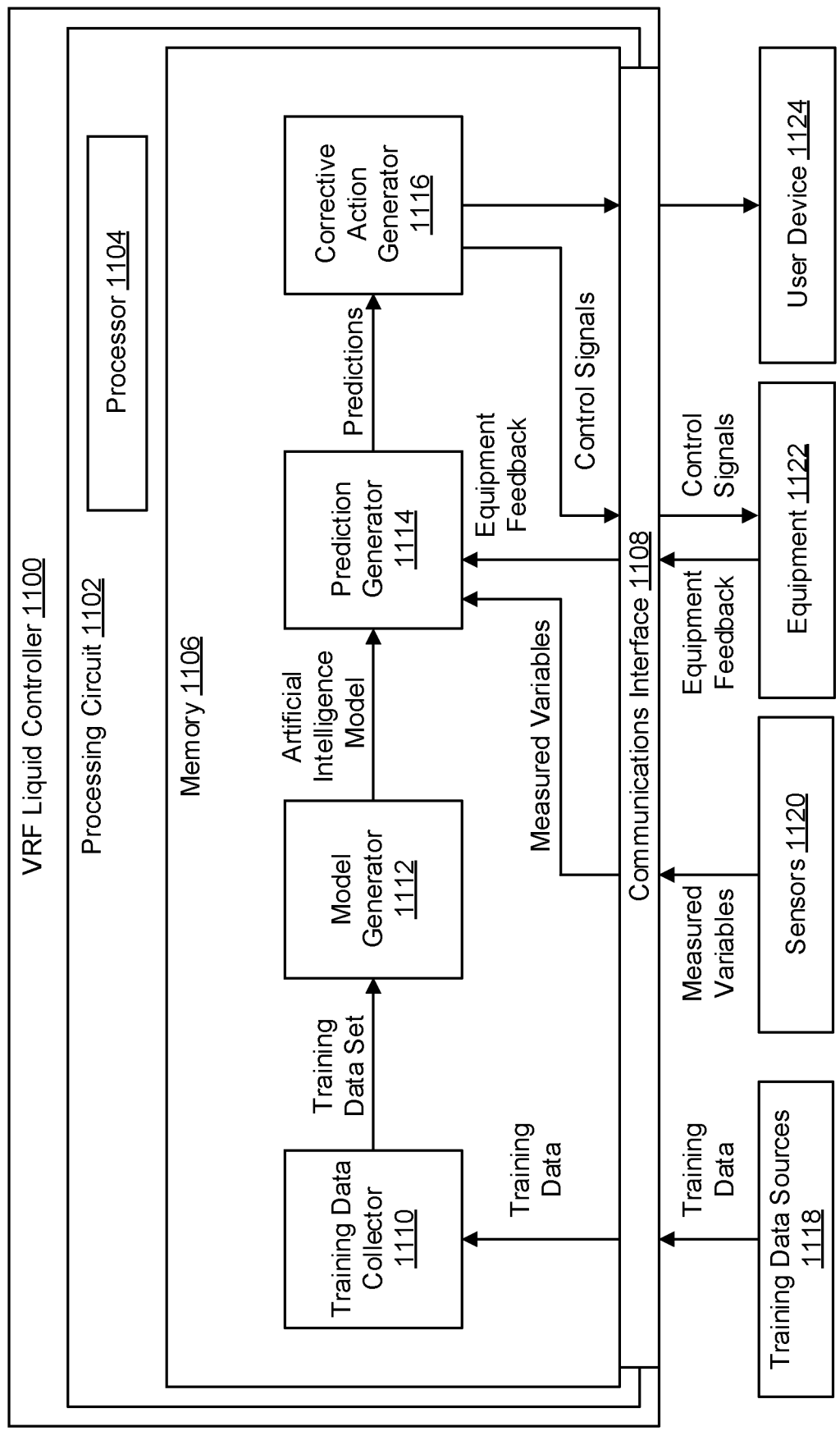
FIG. 11 is a block diagram of a controller for predicting liquid characteristics, according to some embodiments.
Figure 12A:
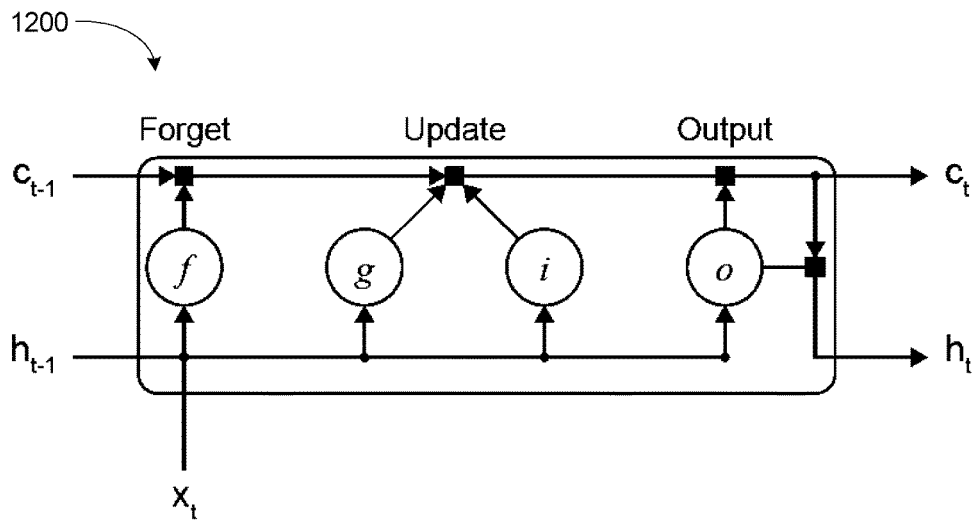
FIG. 12A is an illustration of a long short-term memory model structure, according to some embodiments.
Figure 12B:
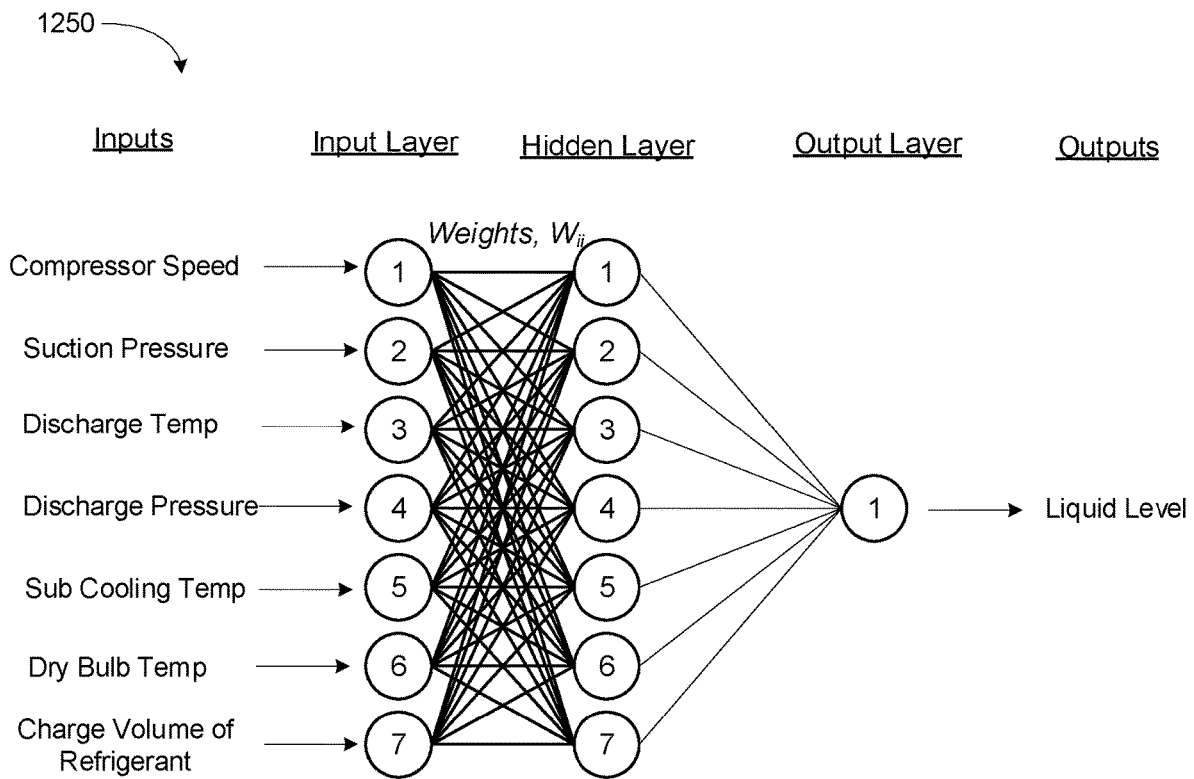
FIG. 12B is an illustration of a neural network (NN) architecture, according to some embodiments.
Figure 13:
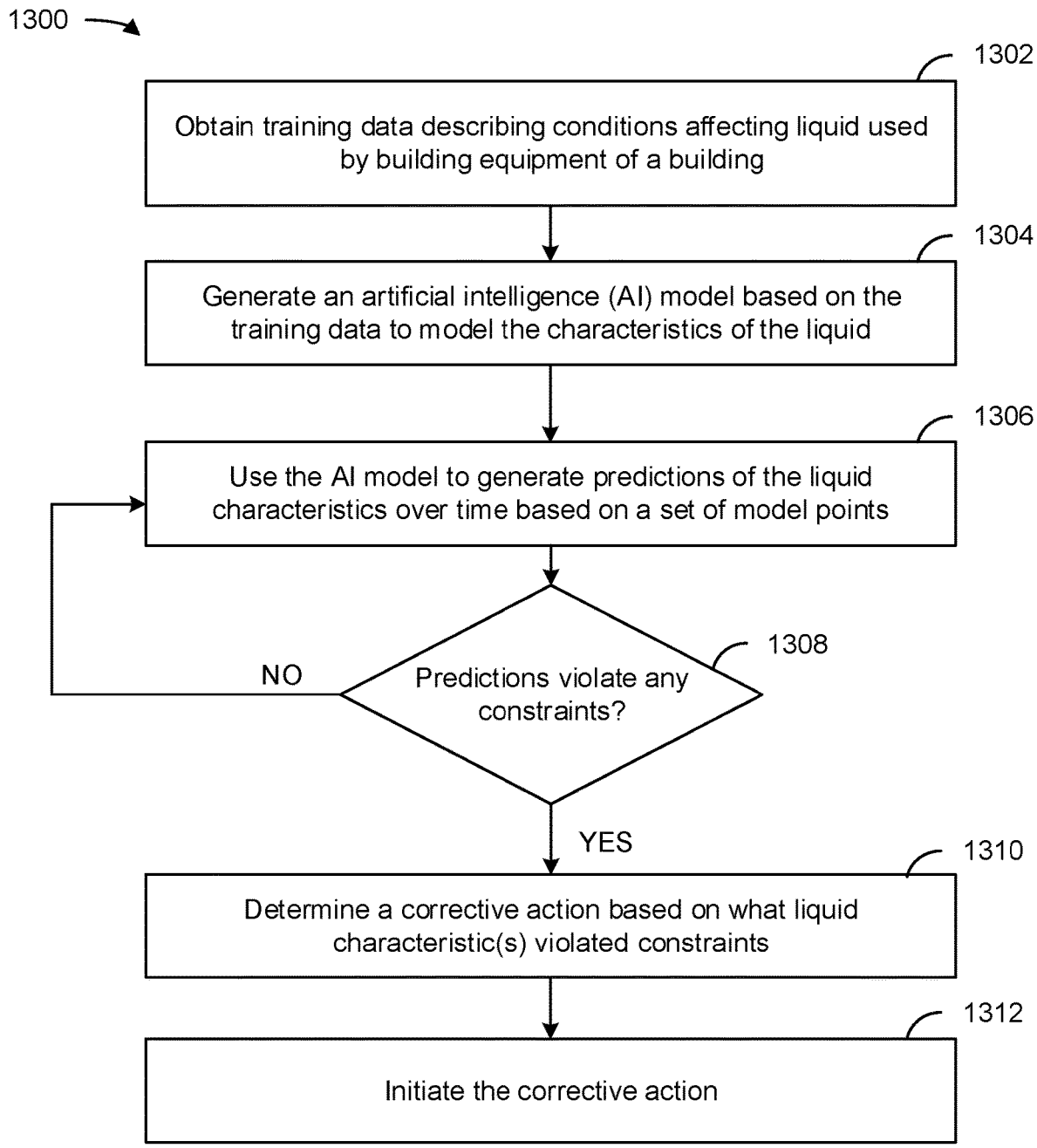
FIG. 13 is a flow diagram of a process for monitoring liquid characteristics using an AI model, according to some embodiments

Referring generally to FIGS. 11-13, systems and methods for estimating and predicting liquid characteristics in a VRF system are shown and described, according to some embodiments. It should be appreciated that the description below is described with reference to a VRF system for sake of example only and should not be regarded as limiting. The systems and methods described throughout FIGS. 11-13 can be similarly applied to a variety of systems that utilize liquid (e.g., refrigerant, oil, oil-refrigerant mixture, etc.) and are not meant to be limited to VRF systems.

The systems and methods described below can utilize AI models to predict how characteristics of the liquid change over time based on a variety of inputs. As discussed above with regard to FIGS. 8-10, the AI models can include any appropriate type of AI model. For example, the AI models may be or include long short-term memory (LSTM) models, other types of recurrent neural networks (RNNs), convolutional neural networks (CNNs), etc. In some embodiments, RNN models such as LSTM models are preferred due to the time-series nature of the liquid characteristic. The AI model can be trained to predict certain refrigerant characteristics based on a set of training data, which may be provided by a variety of sources. In some embodiments, a simulation model is utilized to generate the training data used to train the AI model. Training data generated using the simulation model may be used separately or in addition to training data gathered from other sources (e.g., from measured states of an actual system). Once trained based on a set of training data, the AI model can predict liquid characteristics based on the inputs. For example, the AI model may predict a liquid level in an accumulator. As discussed above, based on the predicted liquid characteristics, a determination can be made whether the predicted liquid characteristics adhere to pre-defined thresholds and/or generate/initiate a corrective action. It should be noted that machine learning models may be referred to herein as synonymous with AI models.

Referring now to FIG. 11, a block diagram of a VRF liquid controller 1100 for predicting characteristics of liquid is shown, according to some embodiments. In particular, the VRF liquid controller 1100 may predict characteristics of liquid in an accumulator of a VRF system. However, VRF liquid controller 1100 can be applied to a variety of other systems/devices (e.g., other HVAC systems, car systems, fire safety systems, etc.) that require liquid (e.g., oil, refrigerant, oil-refrigerant mixture, etc.) to properly operate. In some embodiments, the VRF liquid controller 1100 and/or components therein are incorporated in BMS controller 366 as described with reference to FIGS. 3-4 and/or another controller. In some embodiments, the VRF liquid controller 1100 is used to operate some and/or all of the VRF systems described throughout FIGS. 7A-7B.

VRF liquid controller 1100 is shown to include a communications interface 1108 and a processing circuit 1102. Communications interface 1108 may include wired or wireless interfaces (e.g., jacks, antennas, transmitters, receivers, transceivers, wire terminals, etc.) for conducting data communications with various systems, devices, or networks. For example, communications interface 1108 may include an Ethernet card and port for sending and receiving data via an Ethernet-based communications network and/or a Wi-Fi transceiver for communicating via a wireless communications network. Communications interface 808 may be configured to communicate via local area networks or wide area networks (e.g., the Internet, a building WAN, etc.) and may use a variety of communications protocols (e.g., BACnet, IP, LON, etc.).

Communications interface 1108 may be a network interface configured to facilitate electronic data communications between the VRF liquid controller 1100 and various external systems or devices (e.g., equipment 1122, sensors 1120, a user device 1124, etc.). For example, the VRF liquid controller 1100 may receive equipment feedback from equipment 1122 via communications interface 1108.

Processing circuit 1102 is shown to include a processor 1104 and memory 1106. Processor 1104 may be a general purpose or specific purpose processor, an application specific integrated circuit (ASIC), one or more field programmable gate arrays (FPGAs), a group of processing components, or other suitable processing components. Processor 1104 may be configured to execute computer code or instructions stored in memory 1106 or received from other computer readable media (e.g., CDROM, network storage, a remote server, etc.).

Memory 1106 may include one or more devices (e.g., memory units, memory devices, storage devices, etc.) for storing data and/or computer code for completing and/or facilitating the various processes described in the present disclosure. Memory 1106 may include random access memory (RAM), read-only memory (ROM), hard drive storage, temporary storage, non-volatile memory, flash memory, optical memory, or any other suitable memory for storing software objects and/or computer instructions. Memory 1106 may include database components, object code components, script components, or any other type of information structure for supporting the various activities and information structures described in the present disclosure. Memory 1106 may be communicably connected to processor 1104 via processing circuit 1102 and may include computer code for executing (e.g., by processor 1104) one or more processes described herein. In some embodiments, one or more components of memory 1106 are part of a singular component. However, each component of memory 1106 is shown independently for ease of explanation.

Memory 1106 is shown to include a training data collector 1110. Training data collector 1110 can collect training data used to train an artificial intelligence model from one or more training data sources 1118. Specifically, training data collector 1110 can obtain training data associated with liquid characteristics of a VRF system (e.g., a liquid level of an accumulator, an oil level of an accumulator, a refrigerant level of an accumulator, etc.).

The training data collected by training data collector 1110 can include any relevant data that can be used to train an AI model to learn associations between certain inputs and liquid characteristics of a VRF system. The training data may include values for inputs including, for example, a compressor speed, a suction pressure, a discharge temperature, a discharge pressure, a temperature of refrigerant vapor and/or a temperature of other gas within a VRF system (e.g., a sub cooling temperature of the VRF system, etc.), an ambient temperature near a VRF system (e.g., a dry bulb temperature of the VRF system, etc.), a charge volume of the refrigerant (e.g., a measured charge volume of the refrigerant, a predicted charge volume of refrigerant of FIGS. 8-10, etc.), etc.

To gather the training data, training data collector 1110 may transmit queries to training data sources 1118 to obtain the training data. In some embodiments, training data collector 1110 passively receives training data from training data sources 1118 without needing to actively request the training data. Training data sources 1118 can include any source of data that can store and/or provide training data to training data collector 1110. For example, training data sources 1118 may be or include a user device (e.g., a laptop, a desktop computer, a mobile device, a tablet, etc.) that can provide a stored training data set to training data collector 1110. In some embodiments, the training data sources 1118 include components of FIG. 8-10 (e.g., refrigerant management controller 800, etc.) that can provide a training data set (e.g., usage data, etc.). As another example, training data sources 1118 may be or include a database (e.g., a cloud database) that stores data collected during operation of an actual VRF system. In this way, the AI model can be trained based on data collected directly from actual VRF devices in operation.

In some embodiments, training data collector 1110 utilizes one or more simulation models to generate some or all of the training data used by model generator 1112 to generate the AI model. A simulation model (also referred to as a "simulation" or "simulation framework" herein) can simulate how an actual VRF system may operate under various conditions and/or limitations (e.g., weather conditions, heating/cooling loads, intrinsic device limitations, etc.). The simulation model can account for relationships between components of the VRF system and how the components may react to changing conditions. For example, the simulation model can model a liquid level in an accumulator of a VRF system, and/or how a VRF system functions as a result.

By utilizing the simulation model, training data collector 1110 may not need to retrieve training data from training data sources 1618. Instead, the training data collector 1110 may generate the training data within VRF liquid controller 1100. In some embodiments, the simulation model is hosted by a third party controller/device/system (e.g., a cloud computing system), which provides the training data generated as a result of running the simulation model to VRF liquid controller 1100. In any case, the simulation model can be used/executed to generate a variety of training data representing various operating conditions that can be used to train an AI model. Advantageously, the simulation model can generate a large amount of data in a shorter amount of time as compared to gathering training data from an actual VRF system in operation. Moreover, the simulation model can be executed to generate training data illustrative of fringe scenarios that may be dangerous for an actual system to operate under purely for the sake of generating training data (e.g., intense heating/cooling loads, etc.).

Based on the obtained training data, training data collector 1110 can combine the collected training data into a training data set and provide the training data set to a model generator 1112. Based on the training data set, model generator 1112 can generate an AI model that models liquid characteristics over time. Specifically, model generator 1112 can train the AI model to predict liquid characteristics based on specified inputs. For example, model generator 1112 may train the AI model to predict values of liquid in in an accumulator, oil levels in an accumulator, refrigerant levels in an accumulator, oil-refrigerant mixture levels in an accumulator, an ambient temperature, a discharge temperature, a suction pressure, a discharge pressure, and/or a gas temperature.

The AI model generated by model generator 1112 can be of any various AI model architectures. For example, the AI model may be an RNN such as an LSTM network.

Inputs to the AI model generated by model generator 1112 can include a variety of inputs associated with operation of a VRF system. For example, inputs to the AI model may include a compressor speed, a suction pressure, a discharge temperature, a discharge pressure, a temperature of refrigerant vapor and/or a temperature of other gas within a VRF system (e.g., a sub cooling temperature of the VRF system, etc.), an ambient temperature near a VRF system (e.g., a dry bulb temperature of the VRF system, etc.), a charge volume of the refrigerant (e.g., a measured charge volume of the refrigerant, a predicted charge volume of refrigerant of FIGS. 8-10, etc.), etc. Example illustrations of the AI models that can be generated by model generator 1112 are described in greater detail below with reference to FIGS. 12A and 12B.

Model generator 1112 may utilize a variety of training techniques to generate the AI model. For example, model generator 1112 may utilize a stochastic gradient descent with momentum approach, an adaptive moment estimation approach, a root mean square propagation approach, etc. With specific regard to the root mean square propagation approach, model generator 1112 may utilize a root mean squared error (RMSE) to measure how accurate model predictions are relative to the training data provided by training data collector 1110. To monitor the RMSE over time, model generator 1612 may utilize the following equation:

$$RMSE = \sqrt{\overline{(Y_{pred,t} - Y_{test,t})^2}}$$

where $Y_{pred,t}$ is a previous prediction of the AI model for a variable Y at a time step t, and $Y_{test,t}$ is an actual value of the variable Y as indicated by the training data at time step t. The calculation of $(Y_{pred,t} - Y_{test,t})^2$ can be performed for each time step t=1 ... n where n is a total number of predictions. Each difference can then be averaged together. During the training process, model generator 1612 can refine the AI model to reduce the RMSE.

Model generator 1112 can provide the generated AI model to a prediction generator 1114. Prediction generator 1114 can use the AI model to generate predictions of liquid characteristics over time. In order to generate said predictions, prediction generator 1114 can operate to obtain values of inputs required by the AI model from a variety of sources. For example, prediction generator 1114 may obtain equipment feedback from equipment 1122, measured variables from sensors 1120, and/or any other appropriate source of input values.

Equipment 1122 can be or include any devices that can provide values of inputs needed by the AI model. For example, in a VRF system, equipment 1122 may include compressors, a heat exchanger, an accumulator, etc. that can provide usage data (e.g., a suction temperature, a suction pressure, a discharge temperature, a discharge pressure, ambient temperature, sub cooling temperature, dry bulb temperature, charge volume, etc.) to the VRF liquid controller 1100. More particularly, if the AI model requires a compressor speed as an input, equipment 1122 may include one or more compressors that can provide an operating speed as equipment feedback to prediction generator 1114. In some embodiments, equipment 1122 includes components of FIGS. 8-11 (e.g., the refrigerant management controller 800, etc.). More particularly, if the AI model requires a charge volume of refrigerant, equipment 1122 may include the refrigerant management controller 800 that provides the charge volume of refrigerant (e.g., via sensors, as a predicted refrigerant level, etc.).

Sensors 1120 may be or include a variety of sensors that can measure values of inputs (i.e., variables) that are required by the AI model. For example, sensors 1120 may include pressure sensors that measure a suction pressure and/or a discharge pressure. As another example, sensors 1120 may include temperature sensors that measure a discharge temperature, an ambient temperature (e.g., a dry bulb temperature, etc.), and/or a gas temperature (e.g., a sub cooling temperature, etc.).

Based on the AI model and the obtained input values, prediction generator 1114 can generate liquid characteristic predictions by passing the obtained input values through the AI model. As a result of passing the obtained input values through the AI model, the AI model can output values of one or more liquid characteristics (e.g., liquid level, oil level, refrigerant level, oil-refrigerant mixture level, etc.). In this way, characteristics of the liquid in the VRF system can be estimated without the need for additional sensors to measure the liquid characteristics.

In some embodiments, prediction generator 1114 generates predictions regarding multiple stages within a VRF system. For example, prediction generator 1114 may generate a prediction of liquid levels of an accumulator when the VRF system is in a certain mode (e.g., heating mode, cooling mode, off mode, etc.). In said example, predicting the liquid levels may benefit certain corrective actions (e.g., an amount of oil to add/remove from the VRF system, an amount of liquid to return to a compressor, an accumulator, etc.). By generating predictions regarding refrigerant at multiple stages within the VRF system, liquid characteristics can be predicted and tracked over time throughout the VRF system rather than at a single point of the VRF system.

Prediction generator 1114 can also provide the predictions of the liquid characteristics to a corrective action generator 1116. Corrective action generator 1116 can analyze the predicted liquid characteristics to determine if any corrective actions should be initiated and what corrective actions to initiate. A corrective action can refer to any action taken to address liquid characteristics not meeting some predefined threshold(s). Corrective actions may include, for example, providing and/or receiving liquid to/from components of a VRF system to maintain a liquid control state (e.g., return oil to a compressor, return a liquid to a compressor, return refrigerant from an indoor VRF unit to an outdoor VRF unit, etc.), distributing notifications/alerts to user device 1124 to indicate to a user that certain liquid characteristics are violating the predefined thresholds, operating equipment 1122, disabling equipment 1122, automatically scheduling a maintenance activity to be performed on equipment 1122, logging the threshold violation in a database, etc. The predefined threshold(s) can be defined by a user, provided by a manufacturer, estimated based on operating states of equipment in the VRF system, etc. For example, a user or manufacturer may define a highest amount of liquid that the VRF system (e.g., the accumulator) should be operated with. In this case, high liquid levels in an accumulator may result in more rapid deterioration of the compressors (e.g., lack of liquid return, lack of oil, etc.). As should be appreciated, thresholds defined for liquid characteristics can be obtained from a variety of sources (e.g., manufacturers, users, based on predictions, etc.) and can include a variety of limitation types (e.g., ranges, threshold values, exact values to which characteristics should be equal, etc.).

As a more specific example, consider a scenario where the AI model predicts values of liquid characteristics including a liquid level in an accumulator. In the example, corrective action generator 1116 may determine whether the liquid level in the accumulator is above a first threshold value. If the liquid level in the accumulator is high, corrective action generator 1116 may determine the VRF system (e.g., the compressor, etc.) should be operated in order to maintain a liquid control state and provide/receive liquid (e.g., return liquid from the accumulator to the compressor, return refrigerant from an indoor VRF unit to an outdoor VRF unit, return oil from the accumulator of a VRF unit to the compressor of the VRF unit, etc.). In some embodiments, liquid return indicates an operational mode in which components of the VRF system (e.g., a compressor) run at a high speed to bring liquid back (e.g., from the accumulator, from an indoor VRF unit, from components of a VRF system, etc.).

In some embodiments, corrective action generator 1116 compares outputs of the AI model over time to determine if certain liquid characteristics are approaching a threshold violation and will thereby include a deficiency. In this case, corrective action generator 1116 may compare the values of the liquid characteristics outputted by the AI model to previous outputted values of the liquid characteristics. If a particular liquid characteristic is trending towards violating a threshold, corrective action generator 1116 may preemptively initiate a corrective action prior to the violation occurring. For example, if a liquid level is increasing over time (e.g., liquid level in the accumulator is increasing, etc.) and, based on a current trend, will exceed a maximum liquid threshold level within an upcoming time period, corrective action generator 1116 may initiate a corrective action (e.g., liquid return, etc.) prior to the liquid level exceeding the maximum threshold. Advantageously, preemptive initiation of corrective actions can ensure that an amount of time that equipment (e.g., compressors) is operated under conditions associated with violations of liquid characteristic thresholds is reduced. Reducing said amount of time can reduce degradation of the equipment, reduce energy consumption, and/or can provide other benefits.

In some embodiments, corrective action generator 1116 predicts times to initiate certain corrective actions to reduce an impact on equipment 1122 and/or other devices/systems. For example, corrective action generator 1116 may predict a time to initiate liquid return to reduce a negative impact on heating/cooling loads required by a building. In some embodiments, corrective action generator 1116 also predicts a time to temporarily disable equipment 1122 such that liquid can be safely added to the system. In some embodiments, corrective action generator 1116 can operate as a standard equipment controller in the case where no corrective actions are needed (e.g., if liquid level is at an appropriate value).

Referring now to FIG. 12A, an illustration of an LSTM model structure 1200 is shown, according to some embodiments. In some embodiments, the LSTM model structure 1200 is similar to and/or the same as LSTM model structure 925 with reference to FIG. 9B. The LSTM model structure 1200 can illustrate how information is saved between time steps in an RNN, and may include various layers such as, for example, a sequence input layer, one or more drop out layers, one or more fully connected layers, one or more LSTM layers, an output layer, etc. In an exemplary embodiment, the LSTM model structure 1200 includes a sequence input layer and a LSTM layer. As shown in FIG. 12A, LSTM model structure 1200 includes functions f, g, i, and o which are used to generate outputs to the block shown in FIG. 12A. LSTM model structure 1200 is shown to include a forget gate, an update gate, and an output gate. The forget gate can be configured to eliminate non-relevant data from being considered and remembered for future time steps in a time sequence. The update gate can apply some operation to combine input information to account for changes in the data. Finally, the output gate can decide what information is passed as output to the next time step. In some embodiments, the LSTM model structure 1200 also includes a cell candidate gate. In other embodiments, the LSTM model structure 1200 has learnable weights, for example input weight (W), recurrent weight (R), and bias (b). The learnable weights (e.g., matrices, etc.) can be concatenations of W, R, and b, components, respectively. LSTM model structure 925 can include multiple blocks that pass information associated with a particular time step in a time sequence to the next time step. Advantageously, this structure allows information to be retained and not lost between time steps, thereby increasing an accuracy of prediction for time-series data.

Referring now to FIG. 12B, an illustration of a neural network (NN) 1250 for predicting characteristics of a liquid is shown, according to some embodiments. NN 1250 can illustrate an example structure of an AI model that can be generated by model generator 1112 as described above with reference to FIG. 11. Specifically, NN 1250 can illustrate how a neural network can generate a set of outputs based on a set of inputs related to a VRF system. It should be noted, however, that NN 1250 is provided purely for sake of example of a neural network architecture that can be utilized, and is not meant to be limited on neural network architectures that can be utilized by the AI model described with reference to FIG. 11.

NN 1250 is shown to include input nodes in an input layer that correspond to a set of inputs. NN 1250 may receive a compressor speed, a suction pressure, a discharge temperature, a discharge pressure, sub cooling temperature (e.g., a temperature of refrigerant vapor and/or a temperature of other gas within a VRF system), a dry bulb temperature (e.g., an outdoor dry bulb temperature, an ambient temperature near a VRF system), a charge volume of the refrigerant, etc. Each input can be associated with a particular input node of an input layer in NN 1250. In other words, a number of nodes in the input layer may correspond to a number of actual inputs as a one-to-one relationship. It should be appreciated that the inputs shown in FIG. 12B are provided purely for sake of example. NN 1250 can be modified to account for various different inputs depending on implementation.

NN 1250 is also shown to include a hidden layer including hidden nodes. In NN 1250, the hidden layer is shown to include a single layer including a number of hidden nodes that is equivalent to the number of input nodes of the input layer. However, according to various embodiments the hidden layer includes one or more layers including varying numbers of hidden nodes, which may or may not correspond to a number of input nodes. Moreover, the nodes of each layer need not necessarily connect to every node of adjacent layers as shown in FIG. 12B. In NN 1250, a weight W can be applied with regard to connections between two nodes. In some embodiments, each connection between nodes includes a particular value for a particular connection. In some embodiments, various connections between nodes may be associated with the same weight. For example, in an LSTM-specific architecture, the weights associated with connections between input nodes and hidden nodes may be the same. Based on each weighted value incoming to a particular node, a function can be applied to determine a composite value of the node. For example, for hidden node 1 of NN 1250, a function can be applied to the weighted input values incoming to the node to determine a composite value of hidden node 1. Composite values of each node in a particular layer may determine outputs of the particular layer. The outputs of the particular layer can correspond with inputs to a subsequent layer along with weights between the particular layer and the subsequent layer. This process can be repeated for each layer until an output layer is reached.

NN 1250 is also shown to include an output layer including an output node. A number of output nodes in the output layer can correspond to desired outputs of the NN model on a one-to-one basis. With particular regard to the VRF system, the outputs may include liquid level of the VRF system, liquid level of an accumulator, oil level of an accumulator, and/or oil level of a compressor, etc. Accordingly, an output node can correspond with the liquid level (e.g., of the accumulator). With regard to NN 1250, a composite value of output node 1 can correspond to the liquid level. In this way, by simply providing the input values to NN 1250, predicted values of the output can be generated.

Referring now to FIG. 13, a flow diagram of a process 1300 for monitoring liquid characteristics using an AI model is shown, according to some embodiments. Process 1300 can leverage the AI model to predict values of the liquid characteristics, and can initiate corrective actions if said values do not meet predefined thresholds. While process 1300 is described primarily with reference to a building system (e.g., a VRF system), process 1300 can be applied to a variety of systems that include components/devices that require liquid (e.g., oil, refrigerant, oil-refrigerant mixture, etc.) for proper operation. For example, process 1300 can be applied to VRF systems, other HVAC systems, fire safety systems, etc. In some embodiments, some and/or all steps of process 1300 are performed by the VRF liquid controller 1100 as described with reference to FIG. 11.

At step 1302, training data describing conditions affecting liquid used by building equipment of a building is obtained, according to an exemplary embodiment. The building equipment can include a variety of devices that can affect a variable state or condition of the building and utilizes liquid for proper operation. For example, the building equipment may include components of a VRF system (e.g., compressors, accumulators, heat exchangers, etc.), AHUs, other subplants, etc. The training data can be obtained from a variety of sources, and may be of any suitable form (e.g., usage data, etc.). For example, the training data may include usage data obtained from components of a VRF system (e.g., compressors, an accumulator, etc.), components of a building (e.g., sensors, etc.), etc. The usage data may include, for example, a compressor speed, suction temperature, suction pressure, discharge temperature, discharge pressure, ambient temperature, sub cooling temperature, dry bulb temperature, wet bulb temperature, a refrigerant charge volume, an oil charge volume, a temperature setpoint, etc. In some embodiments, the training data (e.g., a predicted refrigerant charge volume, etc.) is obtained from the refrigerant management controller 800 of FIG. 8. In other embodiments, the training data includes data obtained via direct input from a user, by accessing a database (e.g., a cloud database) storing historical information associated with operation of the equipment, from training data provided by a manufacturer of the building equipment, etc. In some embodiments, training data is obtained when the building equipment is in a specific mode (e.g., a heating mode, a cooling mode, an off mode, etc.).

In some embodiments, step 1302 includes generating the training data using a simulation model. If a simulation model is used, the simulation model can generate some and/or all of the training data obtained in step 1302. The simulation model can be structured to account for various aspects of the system including the building equipment such as, for example, how much liquid is used by devices of the building equipment during operation, how external weather conditions and/or other ambient conditions affect the system, various heating/cooling loads of the building, etc. During generation of the training data, variables associated with the simulation model can be manipulated to generate training data representing a variety of scenarios. Using the simulation model in step 1302 can result in a greater amount of training data being available in a shorter amount of time as compared to gathering data based on actual operation of the building equipment. Moreover, using the simulation model in step 1302 can help obtain training data describing fringe cases that may not be typically included in training data collected based on actual device operation (e.g., when a VRF system is in a heating mode, a cooling mode, an off mode, subject to dangerously high loads, dangerous operating conditions, etc.). In some embodiments, step 1302 is performed by training data collector 1110.

At step 1304, an artificial (AI) model is generated based on the training data that models the characteristics of the liquid, according to an exemplary embodiment. The AI model can be of a variety of AI models such as, for example, an RNN model (e.g., an LSTM model), a CNN model, etc. The AI model can be generated to associate the conditions affecting the liquid and the liquid characteristics themselves. Specifically, the AI model may be trained to associate certain inputs (e.g., a compressor speed, suction pressure, discharge temperature, discharge pressure, ambient temperature, sub cooling temperature, dry bulb temperature, a refrigerant charge volume, etc.). In some embodiments, step 1304 may include training weights associated with connections between nodes of the AI model to account for relationships between the conditions and the characteristics of the liquid. In some embodiments, step 1304 is performed by model generator 1112.

At step 1306, the AI model is used to generate predictions of the liquid characteristics over time based on a set of model inputs, according to an exemplary embodiment. As described above in step 1304, the AI model can be trained to associate certain inputs with certain outputs. Accordingly, once trained, the AI model can utilize values of the inputs to predict corresponding values of the outputs (i.e., a liquid level in an accumulator, an oil level in an accumulator, a refrigerant level in an accumulator, liquid characteristics, etc.). In some embodiments, step 1306 is performed by prediction generator 1114.

At step 1308, it is determined whether the predictions violate any constraints, according to an exemplary embodiment. In some embodiments, the constraints are predefined constraints that define acceptable values of the liquid characteristics. For example, the constraints may include threshold values the liquid characteristics should be above/below, acceptable ranges of values the liquid characteristics should be within, etc. Specifically, the constraints may be thresholds that should not be violated. As a particular example, a constraint for a liquid level may be defined as a maximum value that the liquid level should be below. For example, a constraint may be a liquid level (e.g., oil level, refrigerant level, oil-refrigerant mixture level) of an accumulator. In said example, if the predicted liquid level is above the maximum value, a violation may be identified. If the predicted liquid characteristics do not violate any constraints and therefore are not deficient (step 1308, "NO"), process 1300 may repeat starting at step 1306. In this case, a new set of predictions can be generated for a subsequent time step such that the liquid characteristics can be monitored/tracked over time. However, if a constraint violation is identified (step 1308, "YES"), process 1300 may proceed to step 1310. In some embodiments, a single constraint violation will result in process 1300 proceeding to step 1310. In some embodiments, multiple constraint violations (e.g., 2 constraint violations, 3 constraint violations, etc.) may be required for process 1300 to proceed to step 1310. In some embodiments, step 1308 includes at least partially accounting for a severity of particular constraint violations in determining whether to proceed to step 1320. For example, a liquid level exceeding a maximum threshold value by a predetermined amount may require some other constraint to also be violated for process 1300 to proceed to step 1310, whereas the liquid exceeding the maximum value by another amount may be independently sufficient for process 1300 to proceed to step 1310. In some embodiments, step 1308 may include predicting whether a liquid characteristic will violate a constraint within an upcoming time period, and if so, causes process 1300 to proceed to step 1310 to preemptively address the anticipated violation. In some embodiments, step 1308 is performed by corrective action generator 1116.

At step 1310, a corrective action is determined based on what liquid characteristic(s) violated the constraint, according to an exemplary embodiment. In other words, the corrective action can be determined to address the particular liquid characteristic(s) that is/are violating one or more constraints/thresholds. For example, if a liquid level violates a constraint (e.g., a maximum allowable value in an accumulator), the corrective action determined may be to return a portion of the liquid to components of a VRF system (e.g., from an accumulator to a compressor, from an indoor VRF unit to an outdoor VRF unit, etc.). As another example, if a liquid level violates a constraint (e.g., a maximum allowable value in an accumulator), the corrective action determined may be to return oil and/or refrigerant to components of a VRF system to maintain a liquid control state (e.g., from an accumulator to a compressor, from an indoor VRF unit to an outdoor VRF unit, from an outdoor VRF unit to an indoor VRF unit, etc.). In some embodiments, if the liquid level violates a constraint, the corrective action determined is to transmit a notification to a user device to notify the user that servicing of the building equipment may be necessary to adjust the liquid level. In some embodiments, step 1310 includes determining a specific time and/or time period for the corrective action to occur. To determine the specific time and/or time period, step 1310 may include monitoring conditions (e.g., operating conditions of devices, ambient conditions, etc.) of the system to determine a time at which a lowest impact on cost, heating/cooling efficiency, etc. may occur. In some embodiments, if the corrective action is transmitting a notification, or if the constraint violation is severe, the determined time and/or time period may be a soonest possible time (e.g., immediately). In some embodiments, step 1310 is performed by corrective action generator 1116.

At step 1312, the corrective action is initiated, according to an exemplary embodiment. By initiating the corrective action determined in step 1310, the one or more constraint/threshold violations identified in step 1308 can be addressed. In this way, an overall amount of time during which the one or more constraint/threshold violations are active can be reduced. Reducing an amount of time during which constraints/thresholds are violated can help reduce degradation of the building equipment, reduce costs (e.g., energy costs), and can increase overall safety of the system, among other benefits. In some embodiments, if step 1310 includes determining when the corrective action should be performed, step 1312 can include initiating the corrective action at the determined time. In some embodiments, step 1312 is performed by corrective action generator 1116.

Experimental Results

Referring generally to FIGS. 14-21, results of example experiments are shown, according to some embodiments. The example experiments of FIGS. 14-24 is provided for illustrative purposes only and is not intended to be limiting on the present disclosure, but rather to show the practicality of utilizing an AI model in predicting liquid characteristics. The AI model referenced below throughout FIGS. 14-21 is an LSTM model trained for purposes of predicting liquid characteristics. According to an exemplary embodiment, the example experiments in FIGS. 14-19 indicate that the amount of refrigerant (e.g., the refrigerant level) utilized in an AI model influence the accuracy of the predictions of the liquid level of the accumulator. As will be discussed in greater detail below, the higher the amount of refrigerant in an accumulator (e.g., and an AI model) the more accurate the AI model predictions of the liquid level of the accumulator Referring now to FIGS. 14A and 14B, a pair of graphs illustrating results of a training process of an AI model for an example experiment are shown, according to some embodiments. In an exemplary embodiment, the example experiment includes an accumulator having a low level of refrigerant. FIG. 14A is shown to include a graph 1400 illustrating changes in RMSE based on a number of iterations of the example training process. FIG. 14B is shown to include a graph 1450 illustrating changes in loss based on the number of iterations. The example training process associated with FIGS. 14A and 14B utilized ten closed loop test cases from a VRF model-based definition (MBD) liquid level plant model with approximately 4,000 seconds allocated for each test case as training data. To determine accuracy of the AI model, a single test data set from the VRF MBD liquid level plant model with approximately 4,000 seconds allocated for each test case was used for comparison.

Graph 1400 is shown to include a series 1402. Series 1402 can illustrate how the RMSE associated with the AI model changes as a result of additional iterations of the training process. Specifically, series 1402 illustrates a generally decreasing trend as the number of iterations increases. In other words, increasing the number of iterations can improve accuracy of the AI model. It should be noted that series 1402 represents a smoothed curve of the data points of RMSE collected at each iteration.

Graph 1450 is shown to include a series 1452. Series 1452 can illustrate how a loss associated with the AI model changes over time based on a number of iterations. In this case, loss describes how inaccurate predictions of the AI model are with a loss of 0 indicating a particular prediction is equivalent to actual measurements. As is apparent from series 1452 and series 1402, accuracy of the AI model for predicting liquid levels increases based on the number of iterations.

Figure 14A:
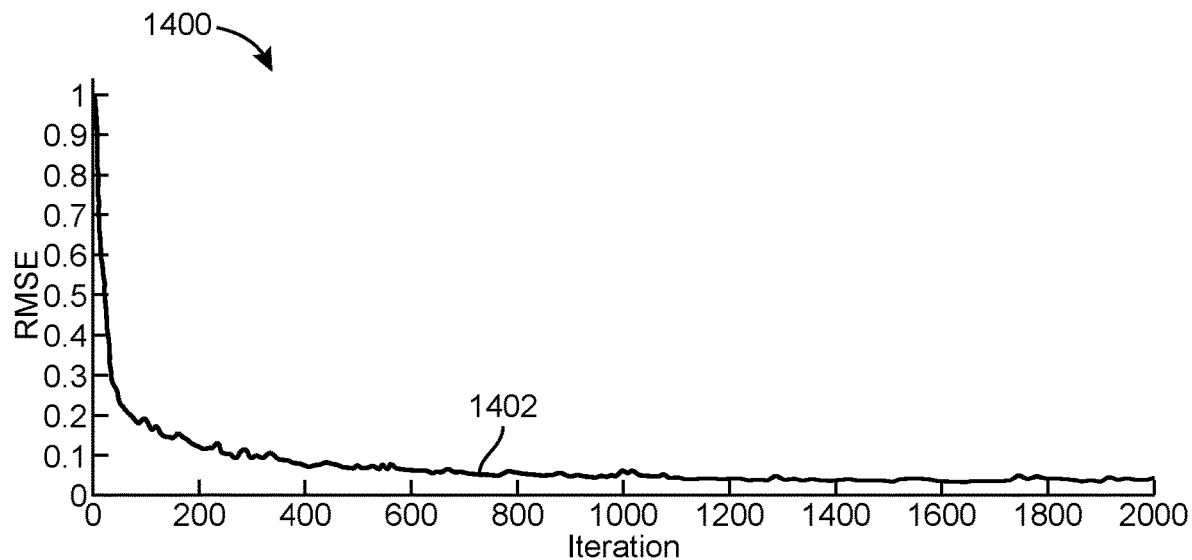
FIG. 14A is a graph illustrating changes in RMSE based on a number of iterations in an example model training process for an artificial intelligence (AI) model, according to some embodiments.
Figure 14B:
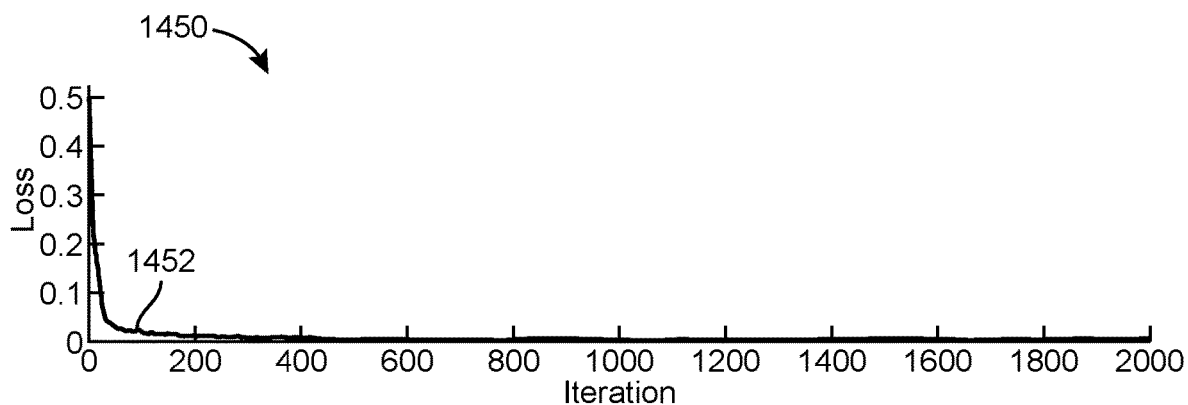
FIG. 14B is a graph illustrating changes in loss based on the number of iterations associated with the AI model of FIG. 14A, according to some embodiments.
Figure 15:
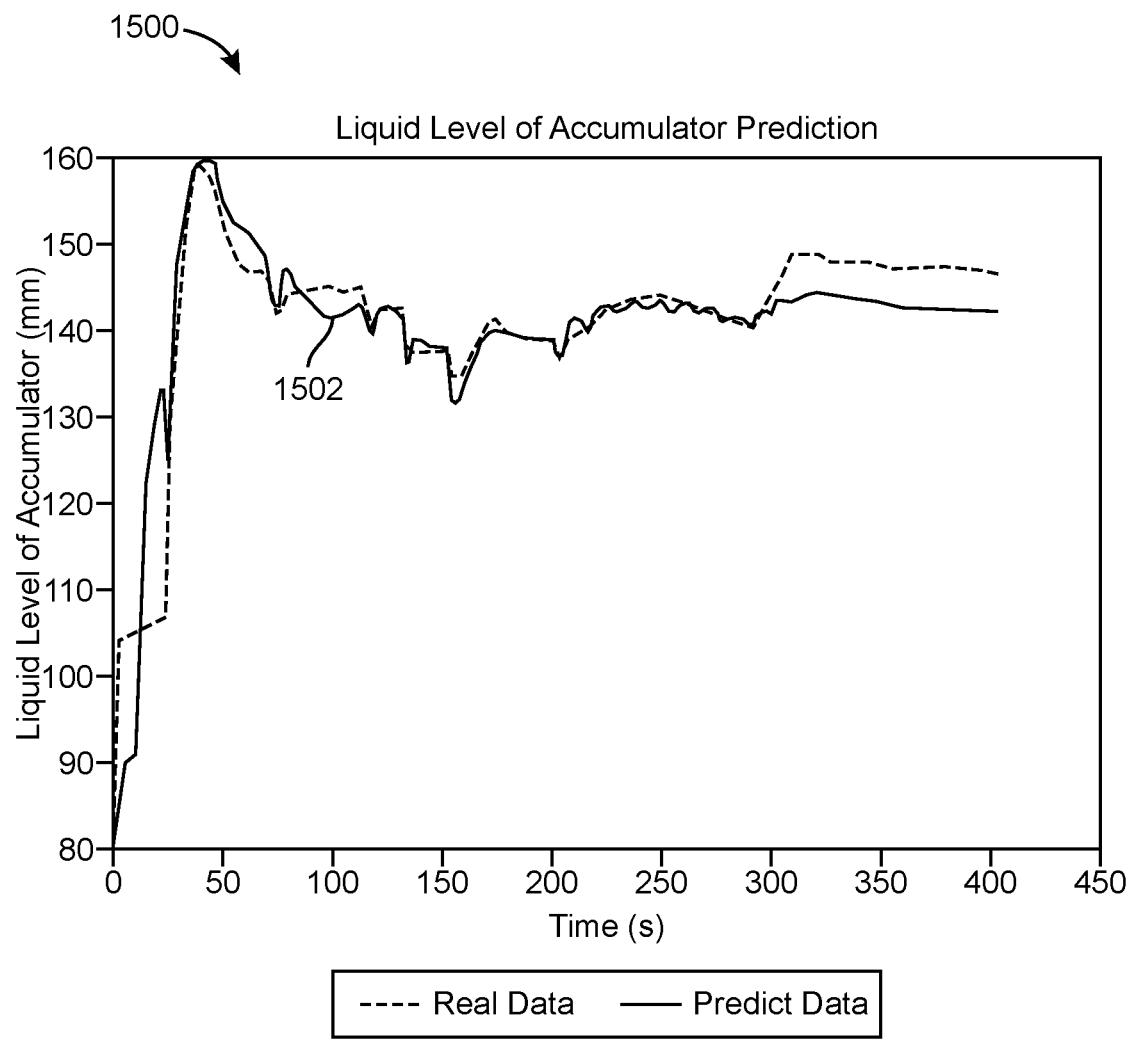
FIG. 15 is a graph illustrating predictions of a liquid level of an accumulator generated by the AI model of FIG. 14A, according to some embodiments.

Referring generally to FIG. 15, a graph 1500 illustrating liquid characteristic predictions of the AI model trained in the example experiment of FIGS. 14A-14B is shown, according to some embodiments. In the example experiment, the AI model took in inputs of a compressor speed, dry bulb temperature, wet bulb temperature, refrigerant charge volume, oil charge volume, the number of indoor open units, the indoor unit wind, and an indoor temperature setpoint to produce predicted outputs of liquid levels in an accumulator. Graph 1500 is shown to include a series 1502 illustrating predicted liquid levels in the accumulator over time. In some embodiments, an objective of operational decisions associated with the accumulator may be to maintain a relatively constant value of the liquid level in the accumulator to ensure steady and reliable operation.

Figure 16A:
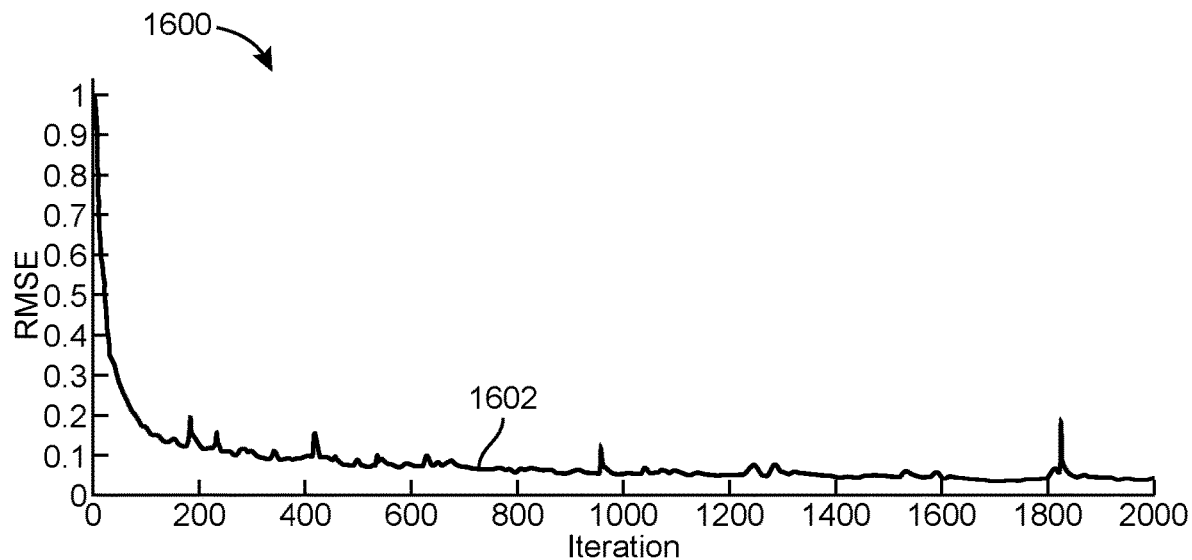
FIG. 16A is a graph illustrating changes in RMSE based on a number of iterations in an example model training process for an artificial intelligence (AI) model, according to some embodiments.
Figure 16B:
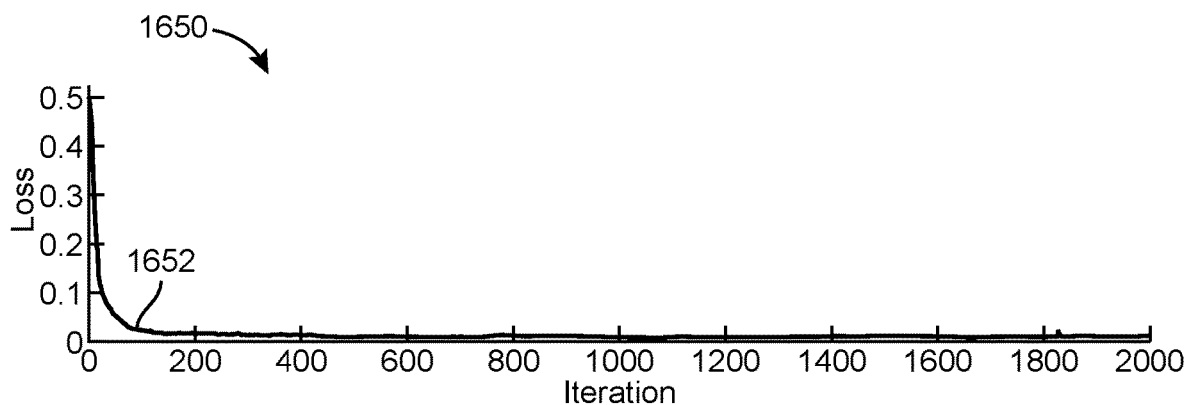
FIG. 16B is a graph illustrating changes in loss based on the number of iterations associated with the AI model of FIG. 16A, according to some embodiments.

Referring now to FIGS. 16A and 16B, a pair of graphs illustrating results of a training process of an AI model for another example experiment are shown, according to some embodiments. In an exemplary embodiment, the example experiment includes an accumulator having a medium level of refrigerant. FIG. 16A is shown to include a graph 1600 illustrating changes in RMSE based on a number of iterations of the example training process. FIG. 16B is shown to include a graph 1650 illustrating changes in loss based on the number of iterations. The example training process associated with FIGS. 16A and 16B utilized ten closed loop test cases from a VRF model-based definition (MBD) liquid level plant model with approximately 4,000 seconds allocated for each test case as training data. To determine accuracy of the AI model, a single test data set from the VRF MBD liquid level plant model with approximately 4,000 seconds allocated for each test case was used for comparison.

Graph 1600 is shown to include a series 1602. Series 1602 can illustrate how the RMSE associated with the AI model changes as a result of additional iterations of the training process. Specifically, series 1602 illustrates a generally decreasing trend as the number of iterations increases. In other words, increasing the number of iterations can improve accuracy of the AI model. It should be noted that series 1602 represents a smoothed curve of the data points of RMSE collected at each iteration.

Graph 1650 is shown to include a series 1652. Series 1652 can illustrate how a loss associated with the AI model changes over time based on a number of iterations. In this case, loss describes how inaccurate predictions of the AI model are with a loss of 0 indicating a particular prediction is equivalent to actual measurements. As is apparent from series 1652 and series 1602, accuracy of the AI model for predicting liquid levels increases based on the number of iterations.

Figure 17:
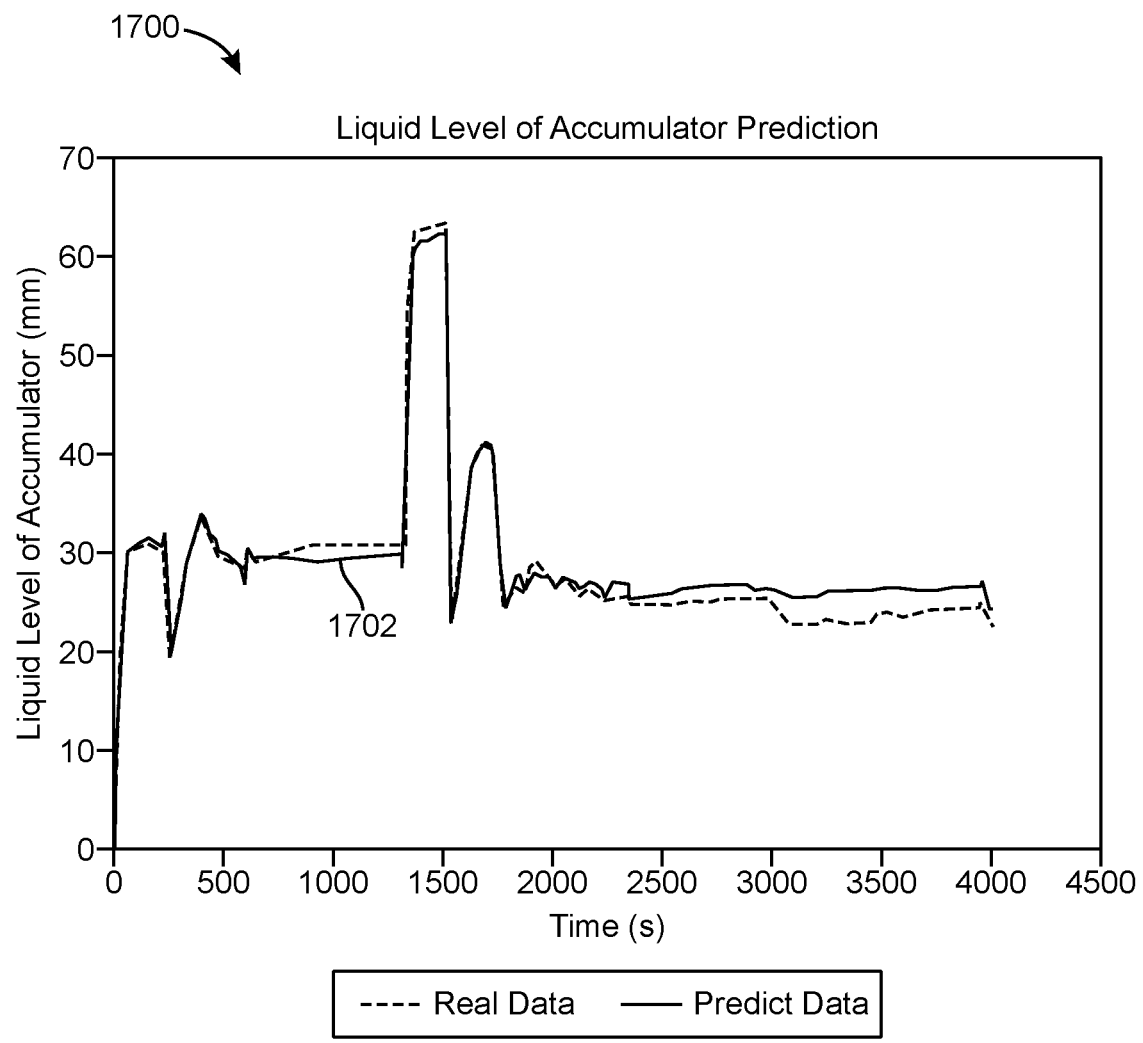
FIG. 17 is a graph illustrating predictions of a liquid level of an accumulator generated by the AI model of FIG. 16A, according to some embodiments.

Referring generally to FIG. 17, a graph 1700 illustrating liquid characteristic predictions of the AI model trained in the example experiment of FIGS. 16A-16B is shown, according to some embodiments. In the example experiment, the AI model took in inputs of a compressor speed, dry bulb temperature, wet bulb temperature, refrigerant charge volume, oil charge volume, the number of indoor open units, the indoor unit wind, and an indoor temperature setpoint to produce predicted outputs of liquid levels in an accumulator. Graph 1700 is shown to include a series 1702 illustrating predicted liquid levels in the accumulator over time. In some embodiments, an objective of operational decisions associated with the accumulator may be to maintain a relatively constant value of the liquid level in the accumulator to ensure steady and reliable operation.

Figure 18A:
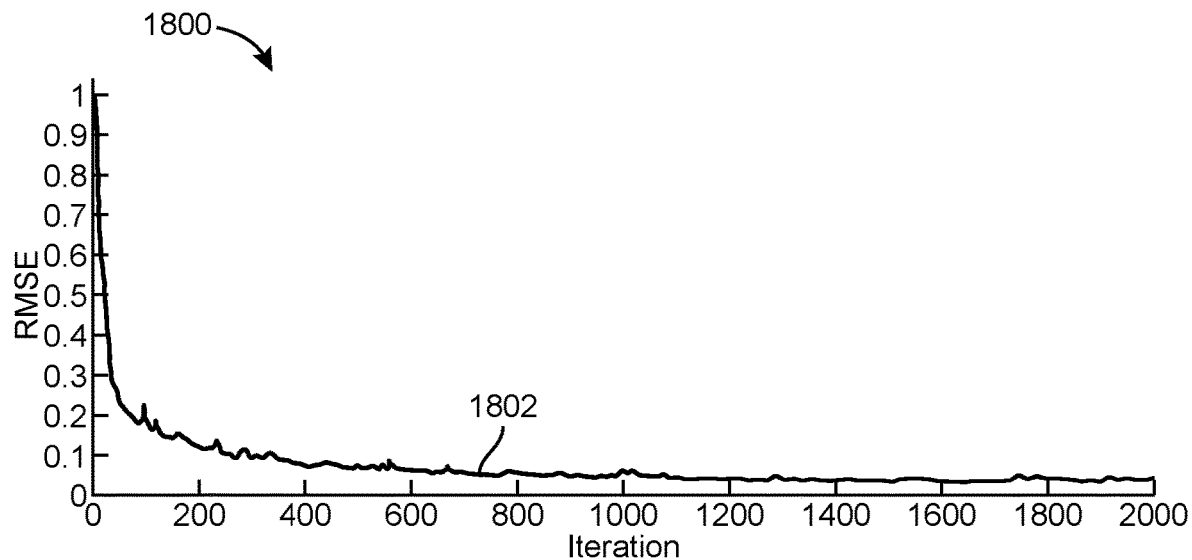
FIG. 18A is a graph illustrating changes in RMSE based on a number of iterations in an example model training process for an artificial intelligence (AI) model, according to some embodiments.
Figure 18B:
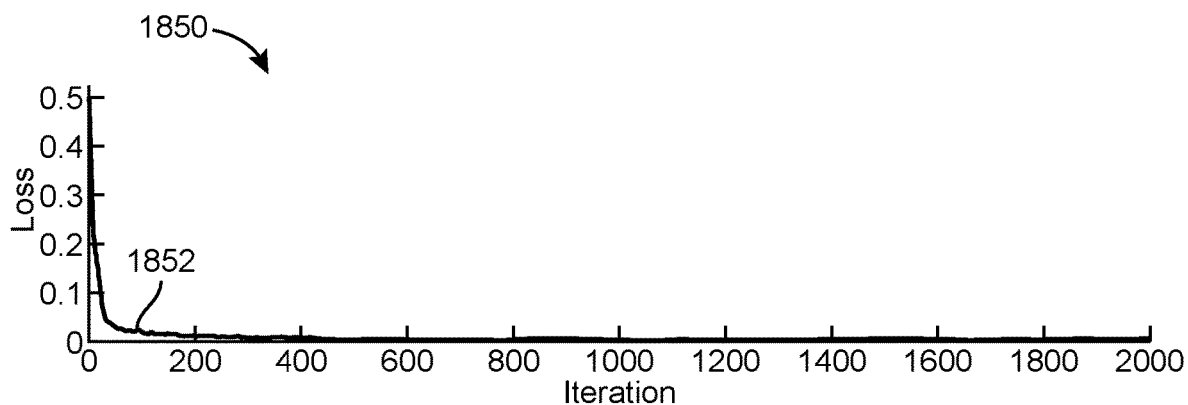
FIG. 18B is a graph illustrating changes in loss based on the number of iterations associated with the AI model of FIG. 18A, according to some embodiments.

Referring now to FIGS. 18A and 18B, a pair of graphs illustrating results of a training process of an AI model for another example experiment are shown, according to some embodiments. In an exemplary embodiment, the example experiment includes an accumulator having a high level of refrigerant. FIG. 18A is shown to include a graph 1800 illustrating changes in RMSE based on a number of iterations of the example training process. FIG. 18B is shown to include a graph 1850 illustrating changes in loss based on the number of iterations. The example training process associated with FIGS. 18A and 18B utilized ten closed loop test cases from a VRF model-based definition (MBD) liquid level plant model with approximately 4,000 seconds allocated for each test case as training data. To determine accuracy of the AI model, a single test data set from the VRF MBD liquid level plant model with approximately 4,000 seconds allocated for each test case was used for comparison.

Graph 1800 is shown to include a series 1802. Series 1802 can illustrate how the RMSE associated with the AI model changes as a result of additional iterations of the training process. Specifically, series 1802 illustrates a generally decreasing trend as the number of iterations increases. In other words, increasing the number of iterations can improve accuracy of the AI model. It should be noted that series 1802 represents a smoothed curve of the data points of RMSE collected at each iteration.

Graph 1850 is shown to include a series 1852. Series 1852 can illustrate how a loss associated with the AI model changes over time based on a number of iterations. In this case, loss describes how inaccurate predictions of the AI model are with a loss of 0 indicating a particular prediction is equivalent to actual measurements. As is apparent from series 1852 and series 1802, accuracy of the AI model for predicting liquid levels increases based on the number of iterations.

Figure 19:
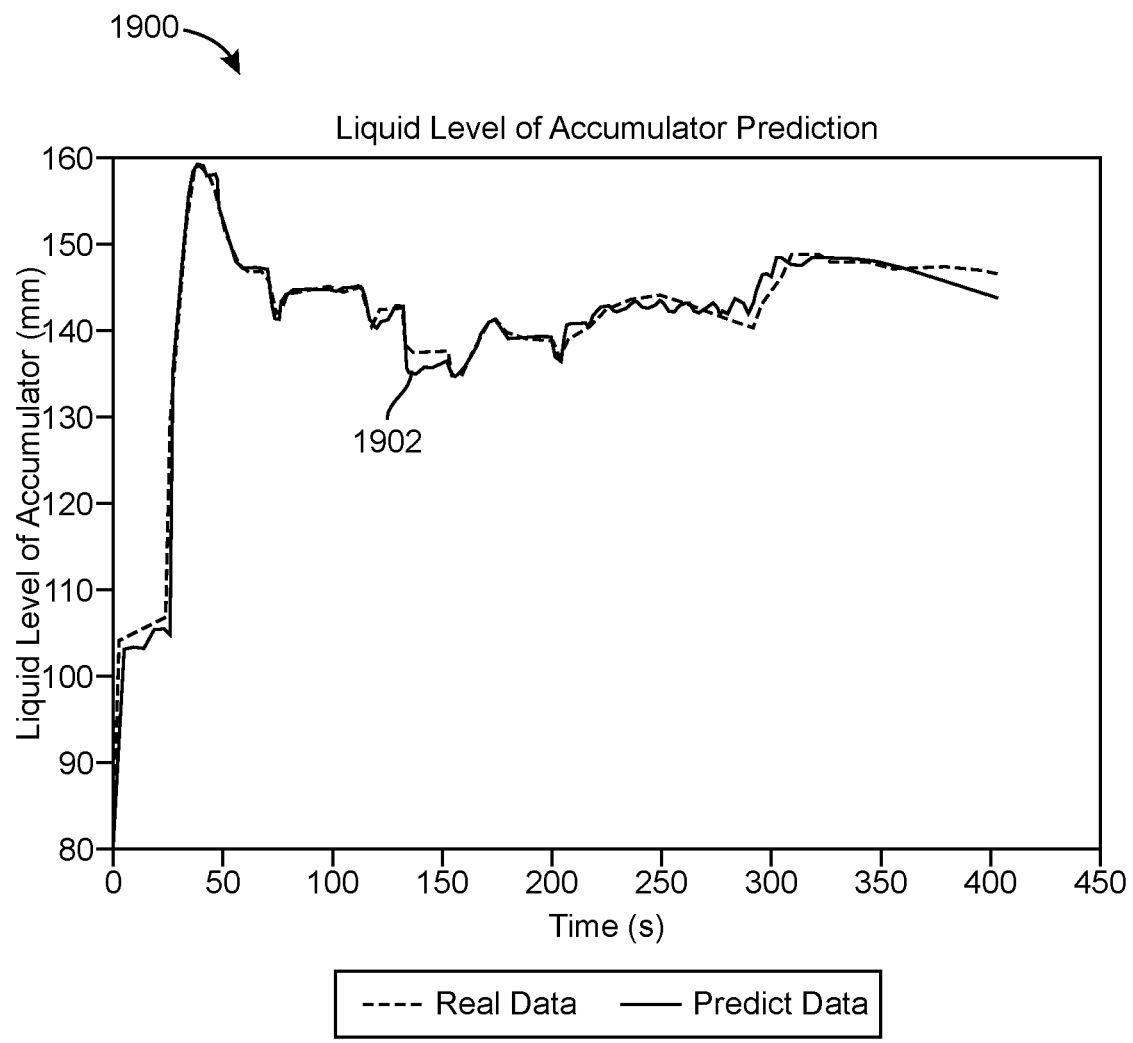
FIG. 19 is a graph illustrating predictions of a liquid level of an accumulator generated by the AI model of FIG. 18A, according to some embodiments.

Referring generally to FIG. 19, a graph 1900 illustrating liquid characteristic predictions of the AI model trained in the example experiment of FIGS. 18A-18B is shown, according to some embodiments. In the example experiment, the AI model took in inputs of a compressor speed, dry bulb temperature, wet bulb temperature, refrigerant charge volume, oil charge volume, the number of indoor open units, the indoor unit wind, and an indoor temperature setpoint to produce predicted outputs of liquid levels in an accumulator. Graph 1900 is shown to include a series 1902 illustrating predicted liquid levels in the accumulator over time. In some embodiments, an objective of operational decisions associated with the accumulator may be to maintain a relatively constant value of the liquid level in the accumulator to ensure steady and reliable operation.

Figure 20A:
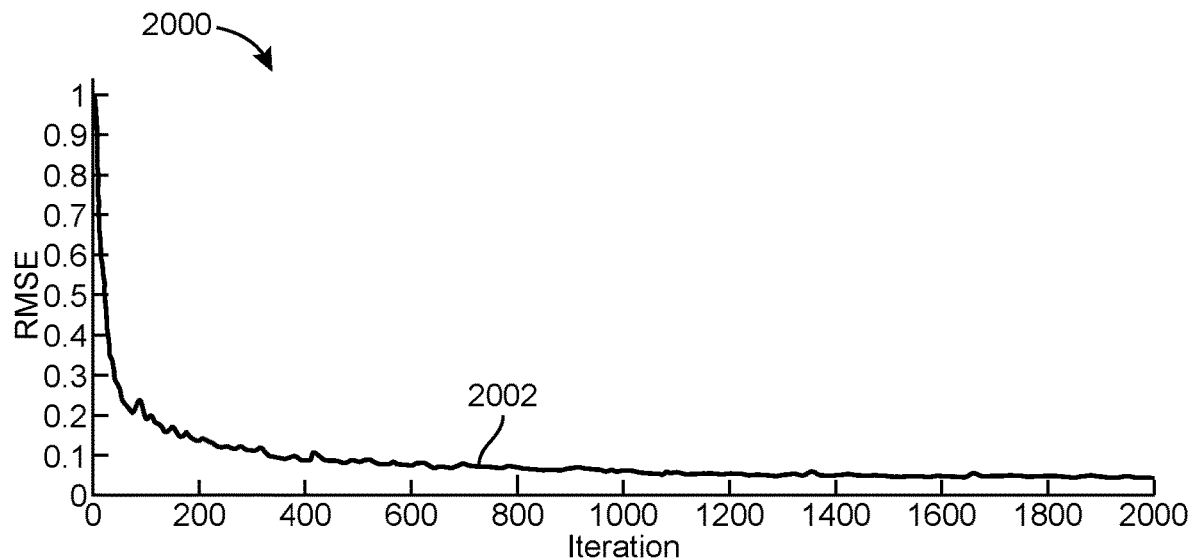
FIG. 20A is a graph illustrating changes in RMSE based on a number of iterations in an example model training process for an artificial intelligence (AI) model, according to some embodiments.
Figure 20B:
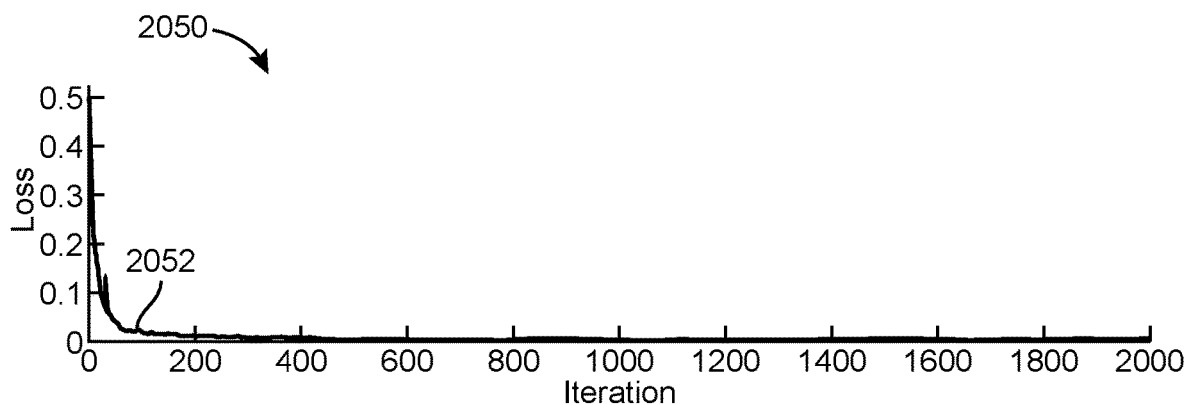
FIG. 20B is a graph illustrating changes in loss based on the number of iterations associated with the AI model of FIG. 20A, according to some embodiments.

Referring now to FIGS. 20A and 20B, a pair of graphs illustrating results of a training process of an AI model for another example experiment are shown, according to some embodiments. In an exemplary embodiment, the example experiment includes an accumulator having a variable level of refrigerant. FIG. 20A is shown to include a graph 2000 illustrating changes in RMSE based on a number of iterations of the example training process. FIG. 20B is shown to include a graph 2050 illustrating changes in loss based on the number of iterations. The example training process associated with FIGS. 20A and 20B utilized ten closed loop test cases from a VRF model-based definition (MBD) liquid level plant model with approximately 4,000 seconds allocated for each test case as training data. To determine accuracy of the AI model, a single test data set from the VRF MBD liquid level plant model with approximately 4,000 seconds allocated for each test case was used for comparison.

Graph 2000 is shown to include a series 2002. Series 2002 can illustrate how the RMSE associated with the AI model changes as a result of additional iterations of the training process. Specifically, series 2002 illustrates a generally decreasing trend as the number of iterations increases. In other words, increasing the number of iterations can improve accuracy of the AI model. It should be noted that series 2002 represents a smoothed curve of the data points of RMSE collected at each iteration.

Graph 2050 is shown to include a series 2052. Series 2052 can illustrate how a loss associated with the AI model changes over time based on a number of iterations. In this case, loss describes how inaccurate predictions of the AI model are with a loss of 0 indicating a particular prediction is equivalent to actual measurements. As is apparent from series 2052 and series 2002, accuracy of the AI model for predicting liquid levels increases based on the number of iterations.

Figure 21:
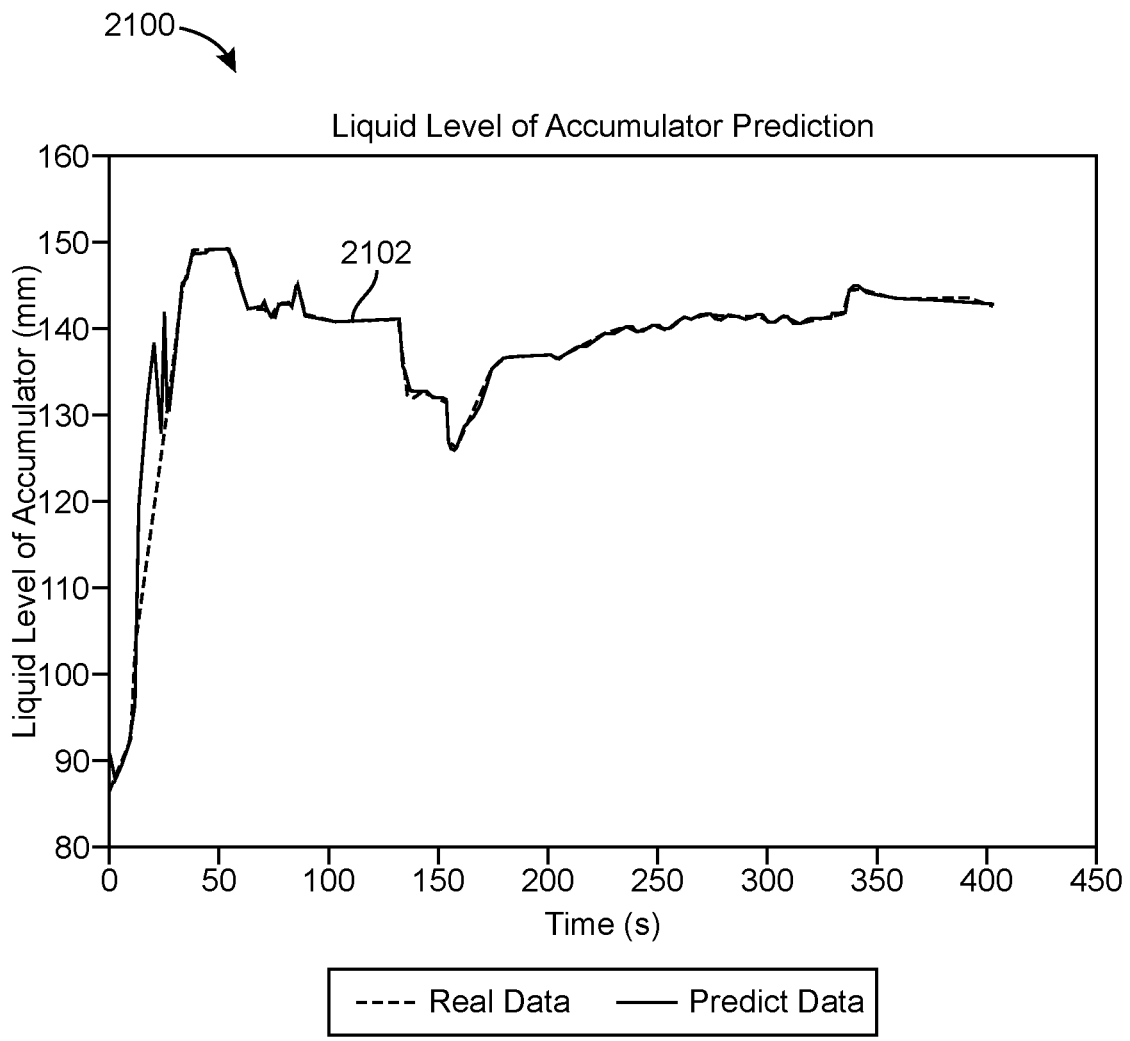
FIG. 21 is a graph illustrating predictions of a liquid level of an accumulator generated by the AI model of FIG. 20A, according to some embodiments.

Referring generally to FIG. 21, a graph 2100 illustrating liquid characteristic predictions of the AI model trained in the example experiment of FIGS. 20A-20B is shown, according to some embodiments. In the example experiment, the AI model took in inputs of a compressor speed, dry bulb temperature, wet bulb temperature, refrigerant charge volume (e.g., variable), oil charge volume, the number of indoor open units, the indoor unit wind, an indoor temperature setpoint, an outdoor temperature (e.g., ambient), and an indoor fan level to produce predicted outputs of liquid levels in an accumulator. Graph 2100 is shown to include a series 2102 illustrating predicted liquid levels in the accumulator over time. In some embodiments, an objective of operational decisions associated with the accumulator may be to maintain a relatively constant value of the liquid level in the accumulator to ensure steady and reliable operation.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A refrigerant charge controller for heating, ventilation, or air conditioning (HVAC) equipment, the controller comprising a processing circuit configured to:
    analyze usage data for the HVAC equipment using a machine learning model to estimate an amount of refrigerant in one or more first devices of the HVAC equipment;
    identify a refrigerant deficiency based on the amount of refrigerant; and
    initiate a corrective action comprising returning a portion of the refrigerant from the one or more first devices of the HVAC equipment to one or more second devices of the HVAC equipment in response to identifying the refrigerant deficiency.

2. The controller of claim 1, wherein:
    the HVAC equipment comprise one or more compressors configured to circulate the refrigerant within a refrigeration circuit; and
    the usage data comprise at least one of a suction temperature or suction pressure of the refrigerant at a suction of the one or more compressors or a discharge temperature or discharge pressure of the refrigerant at a discharge of the one or more compressors.

3. The controller of claim 1, wherein:
    the HVAC equipment comprise one or more valves configured to control a flow of the refrigerant within a refrigeration circuit comprising one or more fluid conduits; and
    the usage data comprise at least one of a valve position of the one or more valves or a length of the one or more fluid conduits.

4. The controller of claim 1, wherein:
    the HVAC equipment comprise variable refrigerant flow (VRF) equipment configured to operate in a heating mode in which the VRF equipment provide heating to a building space and a cooling mode in which the VRF equipment provide cooling to the building space; and
    the usage data are collected while the VRF equipment operate in the heating mode.

5. The controller of claim 1, wherein the processing circuit is configured to:
    simulate operation of the HVAC equipment under a variety of test conditions to generate a set of simulated operational data; and
    train the machine learning model using the set of simulated operational data.

6. The controller of claim 1, wherein:
    identifying the refrigerant deficiency comprises determining that the amount of refrigerant is less than a threshold; and
    initiating the corrective action comprises automatically charging more refrigerant into a refrigeration circuit used by the HVAC equipment.

7. The controller of claim 1, wherein:
    identifying the refrigerant deficiency comprises detecting a refrigerant leak in a refrigeration circuit used by the HVAC equipment; and
    initiating the corrective action comprises initiating a maintenance activity to repair the refrigerant leak.

8. A controller for variable refrigerant flow (VRF) equipment, the controller comprising a processing circuit configured to:
    analyze usage data for the VRF equipment using a machine learning model to estimate an amount of liquid in the VRF equipment;
    identify a liquid deficiency comprising the amount of liquid being greater than a threshold; and
    initiate a corrective action in response to identifying the liquid deficiency.

9. The controller of claim 8, wherein:
    the VRF equipment comprise one or more compressors configured to circulate a refrigerant within a refrigeration circuit; and
    the usage data comprise at least one of a suction pressure of the refrigerant at a suction of the one or more compressors or a discharge temperature or discharge pressure of the refrigerant at a discharge of the one or more compressors.

10. The controller of claim 8, wherein:
    the VRF equipment comprise one or more compressors configured to circulate a refrigerant within a refrigeration circuit; and
    the usage data comprise at least one of a sub cooling temperature of a vapor of the refrigerant, a dry bulb temperature, and a charge volume of the refrigerant.

11. The controller of claim 8, wherein the processing circuit is configured to:
    simulate operation of the VRF equipment under a variety of test conditions to generate a set of simulated operational data; and
    train the machine learning model using the set of simulated operational data.

12. The controller of claim 8, wherein:
    the amount of liquid is an estimated amount of the liquid in an accumulator or one or more indoor VRF units of the VRF equipment;
    identifying the liquid deficiency comprises determining that the amount of liquid is more than a threshold; and
    initiating the corrective action comprises automatically returning a portion of the liquid to a compressor or outdoor VRF unit of the VRF equipment.

13. A controller for variable refrigerant flow (VRF) equipment, the controller comprising one or more processing circuits configured to:
    analyze a first set of usage data for the VRF equipment using a first machine learning model to estimate an amount of refrigerant used by the VRF equipment;
    analyze a second set of usage data for the VRF equipment using a second machine learning model to estimate an amount of liquid in the VRF equipment;
    identify a liquid deficiency based on the amount of liquid; and
    initiate a corrective action in response to identifying the liquid deficiency.

14. The controller of claim 13, wherein the second set of usage data includes the amount of refrigerant used by the VRF estimated by analyzing the first set of usage data.

15. The controller of claim 13, wherein:
    the VRF equipment comprise one or more compressors configured to circulate the refrigerant within a refrigeration circuit; and
    the first set of usage data comprise at least one of a suction temperature or suction pressure of the refrigerant at a suction of the one or more compressors or a discharge temperature or discharge pressure of the refrigerant at a discharge of the one or more compressors.

16. The controller of claim 13, wherein:

the VRF equipment comprise one or more valves configured to control a flow of the refrigerant within a refrigeration circuit comprising one or more fluid conduits; and the first set of usage data comprise at least one of a valve position of the one or more valves or a length of the one or more fluid conduits.

17. The controller of claim 13, wherein:

the VRF equipment are configured to operate in a heating mode in which the VRF equipment provide heating to a building space and a cooling mode in which the VRF equipment provide cooling to the building space; and the first set of usage data are collected while the VRF equipment operate in the heating mode.

18. The controller of claim 13, wherein the one or more processing circuits are configured to:

simulate operation of the HVAC equipment under a first variety of test conditions to generate a first set of simulated operational data and train the first machine learning model using the first set of simulated operational data; and simulate operation of the HVAC equipment under a second variety of test conditions to generate a second set of simulated operational data and train the second machine learning model using the second set of simulated operational data.

19. The controller of claim 13, wherein:

the amount of liquid is an estimated amount of the liquid in an accumulator or one or more indoor VRF units of the VRF equipment;

identifying the liquid deficiency comprises determining that the amount of liquid is more than a threshold; and initiating the corrective action comprises automatically returning a portion of the liquid to a compressor or one or more outdoor VRF units of the VRF equipment.

20. The controller of claim 13, wherein:

identifying the liquid deficiency comprises determining that the amount of liquid is more than a threshold in an accumulator of the VRF equipment; and initiating the corrective action comprises automatically returning a portion of the liquid from the accumulator to a compressor of the VRF equipment.

\* \* \* \* \*